US008269781B2

(12) United States Patent
Pau et al.

(10) Patent No.: US 8,269,781 B2
(45) Date of Patent: Sep. 18, 2012

(54) METHOD AND SYSTEM FOR VIDEO DECODING BY MEANS OF A GRAPHIC PIPELINE, COMPUTER PROGRAM PRODUCT THEREFOR

(75) Inventors: Danilo Pau, Sesto San Giovanni (IT); Antonio Maria Borneo, Matera (IT); Daniele Lavigna, Locate di Triulzi (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 939 days.

(21) Appl. No.: 12/341,725

(22) Filed: Dec. 22, 2008

(65) Prior Publication Data

US 2009/0160866 A1     Jun. 25, 2009

Related U.S. Application Data

(63) Continuation-in-part of application No. PCT/IT2006/000478, filed on Jun. 22, 2006.

(51) Int. Cl.
*G06F 15/16* (2006.01)
*H04B 1/66* (2006.01)

(52) U.S. Cl. ............. 345/503; 375/E7.027; 375/240.25

(58) Field of Classification Search ......................... None
See application file for complete search history.

(56) References Cited

U.S. PATENT DOCUMENTS

| 6,208,350 | B1 | 3/2001 | Herrera |
| 6,538,658 | B1 | 3/2003 | Herrera |
| 2004/0190617 | A1 | 9/2004 | Shen et al. |
| 2007/0018979 | A1* | 1/2007 | Budagavi ..................... 345/426 |
| 2007/0297501 | A1* | 12/2007 | Hussain et al. .............. 375/240 |

OTHER PUBLICATIONS

Hirvonen, A. et al., "H.263 Video Decoding on Programmable Graphics Hardware," Proceedings of the Fifth IEEE International Symposium on Signal Processing and Information Technology, Dec. 21-22, 2005, pp. 902-907.
Shen, G. et al., "Accelerating Video Decoding Using GPU," Proceedings.—IEEE International Conference on Acoustics, Speech, and Signal Processing, vol. 4, Apr. 6-10, 2003, pp. IV-772-775.

* cited by examiner

*Primary Examiner* — Daniel Washburn
*Assistant Examiner* — Donna Ricks
(74) *Attorney, Agent, or Firm* — Seed IP Law Group PLLC

(57) ABSTRACT

A system for decoding a stream of compressed digital video images comprises a graphics accelerator for reading the stream of compressed digital video images, creating, starting from said stream of compressed digital video images, three-dimensional scenes to be rendered, and converting the three-dimensional scenes to be rendered into decoded video images. The graphics accelerator is preferentially configured as pipeline selectively switchable between operation in a graphics context and operation for decoding the stream of video images. The graphics accelerator is controllable during operation for decoding the stream of compressed digital video images via a set of application programming interfaces comprising, in addition to new APIs, also standard APIs for operation of the graphics accelerator in a graphics context.

39 Claims, 14 Drawing Sheets

METHOD AND SYSTEM FOR VIDEO DECODING BY MEANS OF A GRAPHIC PIPELINE, COMPUTER PROGRAM PRODUCT THEREFOR

BACKGROUND

1. Technical Field

The present invention relates to techniques for decoding video signals.

2. Description of the Related Art

There is currently witnessed a diffusion of portable and consumer devices that are able to support 3D-graphics applications and at the same time are able to execute reproduction of compressed digital films according to formats such as, for example, MPEG2.

In a context of this sort, there is felt the need to reduce the overall cost of the hardware (and of the consequent design) and/or to achieve an enrichment of the functions of the graphics card, for example for creating graphic effects during reproduction of a video, and vice versa.

BRIEF SUMMARY

One embodiment is a method having the characteristics recalled in the ensuing claims. Other embodiments include a corresponding system as well as a computer program product, which can be loaded into the memory of at least one computer and comprises portions of software code for implementing the method according to the invention when the product is run on a computer. As used herein, the reference to such a computer program product is understood as being equivalent to reference to a computer-readable medium containing instructions for controlling a computer system in order to coordinate implementation of the method according to the invention. Reference to "at least one computer" is evidently intended to highlight the possibility for the present invention to be implemented according to a distributed/modular scheme.

The claims form an integral part of the technical teaching provided herein.

Basically, the solution described herein enables, in a device that is able to support 3D-graphics applications and at the same time to execute reproduction of compressed digital films (according to formats such as, for example, MPEG2), to eliminate the video decoder and to use the graphics card for carrying out decoding of the video stream: this in so far as the computation power and the algorithms present in a graphics accelerator are, with a few modifications, reusable for said purpose.

For a general definition and illustration of the concept of "graphics accelerator", useful reference may be made to the volume of T. Akenine-Möller and E. Haines "Real-Time Rendering". A graphics accelerator performs the function of graphic rendering by supplying primitives that can be executed concurrently with greater efficiency than a normal CPU (e.g., a CPU x86). The accelerator "lives" in fact closer to the graphics memory and does not have to transfer raw pixel data on a slow general bus and a chipset. In particular, whilst a CPU calculates the coordinates of the next set of graphics commands to be issued, the graphics accelerator can assume the function of filling the polygons for the current set of graphics commands. This sharing of the computational burden is frequently referred to as "load balancing".

A graphics accelerator is able to implement the graphics-rendering algorithms with a parallelism of execution that is exceptional as compared to a CPU that executes them sequentially. In other words, parallelism, pipelining and efficient access to the memory are the key factors that differentiate a graphics accelerator from a normal CPU.

In particular, the solution described herein enables decoding of a video stream encoded, for example, in an MPEG2 format (or other standards such as MPEG4, H264, VC1) using the APIs (Application Programmer's Interfaces) and functions of a 3D-graphics pipeline based, for example, upon the OpenGL ES 1.0 and 1.1 specifications.

A preferred embodiment envisages using existing APIs and some new APIs purposely introduced in order to impart upon a graphics pipeline the instructions so that it can emulate a video decoder. The pipeline itself may possibly undergo modifications at the moment when with its standard functions it is not able to reproduce fully the exact processes executed by the MPEG decoder.

In a currently particularly preferred embodiment of the invention, the standards taken into consideration are:

OpenGL ES 1.0 for the three-dimensional graphics; and

MPEG 2 for video decoding.

Of course, this choice is not to be considered as in any way limiting the generality of the type of streamlined processing typical of the solution described herein, which may also be applied to graphics APIs of other standards (for example, Microsoft Direct or other versions of OpenGL), and other video standards.

BRIEF DESCRIPTION OF THE SEVERAL VIEWS OF THE DRAWINGS

The invention will now be described, purely by way of non-limiting example, with reference to the annexed representations, in which.

DETAILED DESCRIPTION

Figure 1:
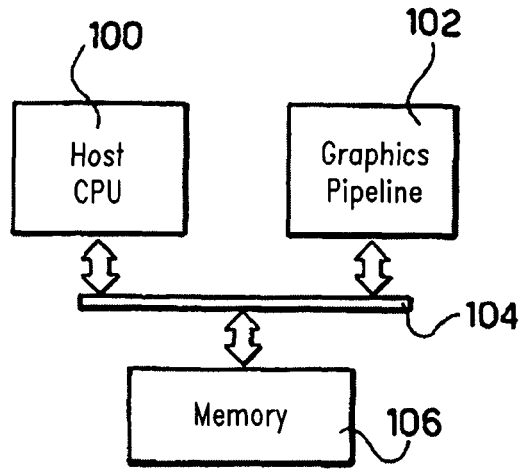
FIG. 1 is a reference block diagram of the system described herein.

FIG. 1 represents the diagram known as OpenGL-ES client-server model. This diagram can also be taken as reference scheme of a system for video signal decoding via a graphics pipeline according to the solution described in what follows.

In FIG. 1, the reference numbers 100 and 102 designate, respectively, a host CPU (having the role of client) and a graphics pipeline e.g., GFX (having the role of server) that dialogue through a channel (bus) 104, also connected to which is a memory 106. Reasoning in general terms, it may be said that, in the framework of such a system, in order to achieve the target of arriving at complete decoding of a video bitstream (e.g., MPEG2: as has been said at the start of this description the reference to MPEG2 is made purely by way of example) the graphics pipeline 102 is modified with respect to the current configurations by means of addition of new functional blocks and modification of some of the existing blocks. There is moreover envisaged a different use of the existing blocks, implemented without in effect modifying the algorithm, but modifying the context. There is moreover envisaged a particular structure that contains the operating parameters of the pipeline, defined via the APIs, by means of which operations to be executed are enabled and disabled, and the parameters on which they operate are defined.

Emulation of the video-decoding process is obtained through a client application that has the task of establishing the sequence of operations to be submitted to the graphics pipeline. In the video framework, as well as in the graphics framework, the application that runs on the host CPU 100 of the system performs a key role in so far as therewith operations are established, input data are supplied to the graphics card, and execution thereof is controlled through invocation of the functions by means of the APIs.

The behavior of the graphics card, and hence the set-up of the operating parameters (context and data) are totally defined by writing applications, which control directly the set-up of the states, the rendering operations and also the operations by pixel, and the so-called client state.

The graphics pipeline 102 is, instead, the server end, i.e., the state machine proper, which executes the graphics algorithms and generates the contents of the frame buffer. In order to maintain compatibility with the pure graphics applications and execute video decoding, modifications are introduced at the algorithm level, which as a consequence lead to the creation of new functions both at the server end and at the client end. At the server end, the state machine that implements the graphics algorithms is informed of a new operating mode by introduction of a new enumerator, which, enabled or otherwise, informs it of the fact that it is working in the video framework. Then, as a consequence, each functional block that has undergone modifications, by means of a simple check on this flag, knows whether it is to apply them or not, preserving the correct operation of the graphics algorithms.

At the client end (host CPU 100), in order to set the right context and hence the operations to be executed, some of the standard APIs of the graphics are used in a manner different from traditional contexts, seeking to exploit the capacities of calculation of the pipeline without being constrained by the specific use that is being made thereof for graphics processing.

Other new APIs have instead been introduced to interact with the new blocks or the functions with which the ones already present in the standard pipeline have been enriched.

As regards the data flow in the pipeline 102, the single-thread pipeline software may be represented schematically as a series of consecutive blocks given its sequential nature and emulates perfectly a hardware pipeline, the difference of which consists in the possibility of parallelization of operations.

Figure 2:
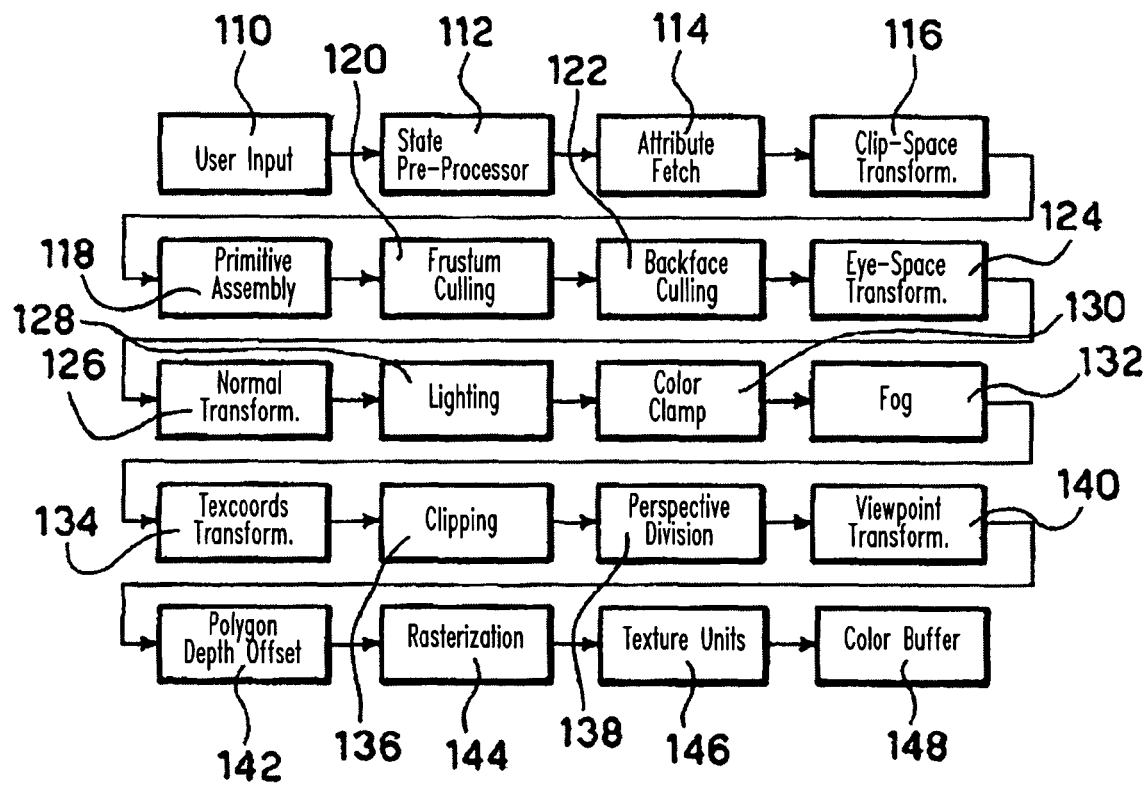
FIG. 2 is a diagram representing a flow of information in the system described herein.

The flow of information is the one is proposed in FIG. 2, where blocks 110 to 138 assume, according to the English terminology currently used in the sector, the following denominations:

| |
|---|
| 110: User Input |
| 112: State Pre-processing |
| 114: Attribute Fetch |
| 116: Clip-Space Transformation |
| 118: Primitive Assembly |
| 120: Frustum Culling |
| 122: Backface Culling |
| 124: Eye-Space Transformation |
| 126: Normal Transformation |
| 128: Lighting |
| 130: Color Clamp |
| 132: Fog |
| 134: TexCoords Transformation |
| 136: Clipping |
| 138: Perspective Division |
| 140: Viewpoint Transformation |
| 142: Polygon Depth Offset |
| 144: Rasterization |
| 146: Texture Units |
| 148: Color Buffer. |

Proceeding according to the known criteria, by means of an API it is possible to establish which block or blocks are enabled, configured, and used in rendering operations. This means that, before each block, the context is recalled, the values thereof are modified, and it is sent to the different blocks, which proceed with the corresponding processing operations as the context specifies. At output from each block, new data on rendering are obtained, and the context is released for subsequent operations.

Figure 3:
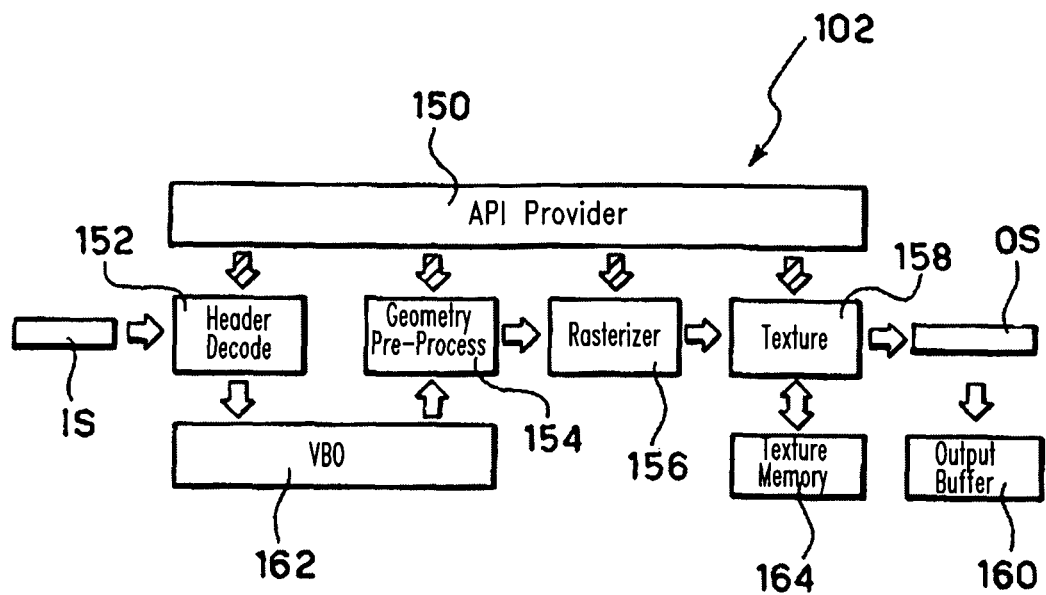
FIG. 3 is a diagram representing the process of decoding of a video stream in the system described herein.

In the solution described herein, the entire process of decoding of a video input stream IS (e.g., MPEG2) through the graphics pipeline may be summarized in the diagram of FIG. 3, where the reference 150 designates as a whole an application that sends respective APIs to a series of blocks 152 to 158, in which Block 152 receives at input the video stream IS and Block 158 produces the output images OS in view of the storage in an output buffer 160 (see also Block 148 of FIG. 2).

The characteristics and functions of Blocks 152 to 158 will now be described in greater detail.

Block 152 performs the function of header decoding and of inverse variable-length coding (IVLC). This block does not form part of the functions of a current graphics pipeline and is introduced as a completely new block with MPEG2 specifications (i.e., according to the coding standard of the input stream IS). Block 152 has the task of taking the video input stream and deriving the various headers of each level of the video to be able to execute the VLC and the zigzag scan. Furthermore, after obtaining the quantized data regarding the blocks, in their three components YUV, it executes decoding of the motion vectors, in an incremental way starting from the references, according to ISO/IEC 13818-2: 1995(E) specifications.

At the end of this operation, in a purposely provided memory area of the pipeline, also the information to be used for the subsequent decoding stages are present, such as frame dimensions and frame number, type of images, and type of macroblocks.

Block 154 (Geometry & Pre-process), which already normally present in the graphics pipeline, by imparting commands with APIs (both standard ones and ones of a new type), creates the 3D scene, which in this case is a simple mesh of two-dimensional triangles contained in a Vertex Buffer Object (VBO) 162. The VBO 162 corresponds to a concept deriving from OpenGL ES 1.1. In practice, the arrays of data that the pipeline uses, such as for example the vertex array, are contained in the client memory. For frequently used data it is desirable that they should reside in a dedicated memory area in the server, and to do this mechanisms are used that enable said data to be allocated, initialized and recalled.

In the video framework, APIs are introduced for deriving the pointers to the video data structures contained in the VBO, in so far as allocation, initialization and destruction are entrusted to the server and transparent to the client.

Next, exploiting its capacity of operating by [4×1] vectors containing the data on the vertices and the capacity of executing fast [4×4]-matrix multiplications, it is able to carry out the inverse quantization and the inverse discrete cosine transform (IDCT).

Block 156, with rasterizer functions, also forms part of the current OpenGL-ES specifications. It receives the list of the primitives from the preceding stage (the mesh of triangles that represent the minimum elements of the frame, i.e., the PELs) and the list of the colors to apply (the data transformed previously) and returns a set of pixels computed on the basis of the size of the final screen, which would correspond in the video to the frame of the prediction errors. A simple modification in the pre-processing stage 154 enables the values representing the color coordinates to reach the rasterizer 156 also in the case where they are negative, without being set at zero, as occurs for the graphics standard, given that they are prediction errors and may even be negative.

Block 158 (texture units) is a graphics unit which, working by pixels, is able to take the fragments leaving the preceding stage 158, the motion data, and the reference images saved in its memory (texture memory) 164 in the preceding steps and to apply the bi-directional motion compensation, using the algorithms of filtering and interpolation and the spatial coordinates used by the graphics functions, with the added capability of working with negative numbers, which in this case is approached in a different manner from in the preceding stage. The rasterizer 156, by its nature of interpolator of geometrical coordinates, as well as color coordinates, is able to manage values with sign—hence, it has been sufficient to prevent zeroing of the negative values—whereas the texture unit 158 is not able to use numbers with sign. In order not to modify the structure too deeply and to prevent conflicts with the graphics, the unit 158 continues to use values without sign, and the sign is "packeted" in the Alpha channel, which in the video framework is not used. Through checks on the value of Alpha, the texture unit 158 decides whether to make an addition or a subtraction; hence it takes into account the sign. In the graphics framework, the Alpha channel is used for rendering transparency, and the texture unit 158 makes only additions.

In the case of multitexturing, used for bi-directional motion compensation, the difference with the graphics is represented by the fact that the value recovered by the texture image that functions as reference is scaled (halved) before being added to the current value of the fragment, given that the final value is the current one (prediction error) plus the average between the two reference values (predictor).

Preferentially, at the level of operations on the individual pixels of the color buffer 160, a simple conversion is implemented from the YUV color format to the classic RGB format used for display of 3D-graphics scenes, before showing the frame saved and re-ordered in the texture memory, through an enrichment of an existing API so as to convert the native format of the video used within the pipeline into the external display format.

Thus, there is achieved in the best possible way the target of executing video decoding by means of a graphics accelerator, by reading the video stream and creating a 3D scene to be rendered in order to cause it to become, with the right information regarding video coding, a frame identical to what would be obtained with an MPEG decoder.

In order to ensure correct operation of the scheme just described, it is important to be able to inform the state machine (i.e., the graphics pipeline 102) of the fact that from that moment on it will process the data and a context that belong to the video.

In this connection, it is possible to take the standard API defined by OpenGL ES in order to control the functions at the server end, and to enrich it with a new enumerator regarding the video:

void glEnable(GLenum cap)
   void glDisable(GLenum cap).

The new enumerator cap defined of a Glenum type is GL_VIDEO_mode.

Possible mode values are:
MPEG2
MPEG4
H264
VC1, also referred to as WM9 i.e., respective values referred to the coding standard of the input stream IS.

In the block diagram of FIG. 3, in Block 152 a dedicated IVLC is associated with decoding of each of these standards. As reference example—hence without in any way this limiting the generality of the process—, the case of the MPEG2 decoding is described in detail in what follows.

Figure 4:
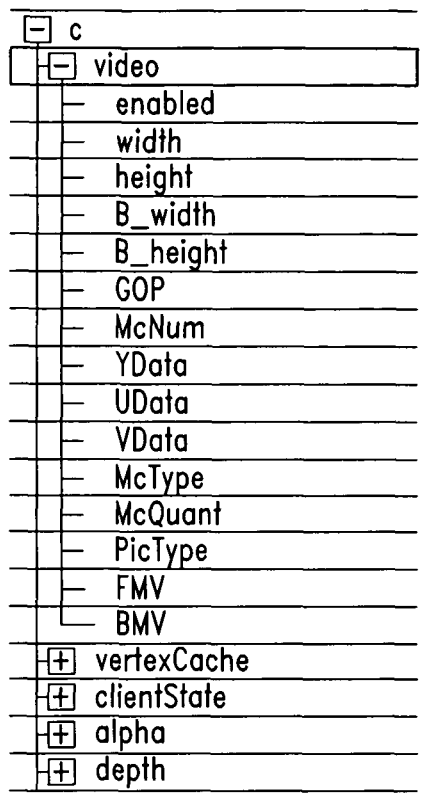
FIGS. 4 to 6 represent context structures that flow in the pipeline of the system described herein.

To be able to exploit this new functionality at the server end a modification of the context structure that flows in all the stages of the pipeline is implemented, accompanying the data, introducing a new part that contains the data on the video, as illustrated in FIG. 4.

The previous API, in the case of Enable, sets the flag c?video?enabled to TRUE; instead, Disable sets the value FALSE.

The other elements of the video structure of the context (c) are data regarding the process of decoding and contain integer values (e.g., GOP, width) and pointers to the memory data (e.g., Ydata, FMV, etc.).

In this way, when the pipeline has to work with the graphics, it is not affected by modifications made for treatment of the video.

In order to explain the modifications at the client end, we will now follow the order of Blocks 152 to 158, explaining as we go the various operations that each block or stage executes for emulating operation of the video decoder.

To pass on now to an examination of the first stage (Header Decoder & Inverse VLC) i.e., Block 152, as has already been said, this is an external block integrated in the pipeline, for which it is possible to make reference to the specifications of the MPEG2 standard. A possible modification at the client end regards the creation of a new API that comes to control operation thereof, passing to it the input parameters.

void glOpenVideoStream (GLchar *pointer).

This API recalls the process explained previously of opening of the MPEG stream, header decoding, VLC and decoding of the motion vectors, passing to it the pointer of a string type that identifies the video file to be decoded.

At the end of the process, the preceding data are present in a memory area, and the video context has been updated with the corresponding values of the video parameters and the pointers to the data in memory.

Furthermore, following upon this process, this block creates the object "mesh of triangles" to be used for each frame and saves it in the VBO 162, in order not to have to re-submit the API to application for each frame and for each pair of triangles, a picture element (PEL) of the video calculates the center coordinates thereof, which are useful then during motion compensation.

At this point, the context and the data flow in the graphics pipeline proper, and, for each action executed, the operations and the corresponding standard or new (API) commands that invoke them will be seen.

In this regard, it should be pointed out which are the contents of the VBO 162, namely the memory area that contains the data and the structures up to now obtained and created.

The structure of a video sequence is hierarchical. In fact, starting from the set of all the frames, i.e., the GOP (group of pictures), the level immediately below is the individual frame, which is in turn constituted by a set of macroblocks.

Even though each macroblock is not the minimum unit of decomposition of a film, it assumes an important role in coding in so far as operations of motion compensation and quantization, as regards the choice of the parameters, are made at the macroblock level. In other words, the motion vectors and the quantization coefficient are evaluated macroblock by macroblock and are applied to all the sub-elements of the macroblock.

The constitutive elements of the macroblock are the blocks, which are in turn constituted by PELs, each of which has three color coordinates, typically YUV.

The data structure contained in the VBO 162 reproduces perfectly this hierarchical structure defined by the video coding, by means of a pointer structure that facilitates the task of search for the data, both at the same hierarchical level, incrementing the pointer, and in a vertical direction given that each element that includes another element also contains the pointer to the contained element.

Figure 5:
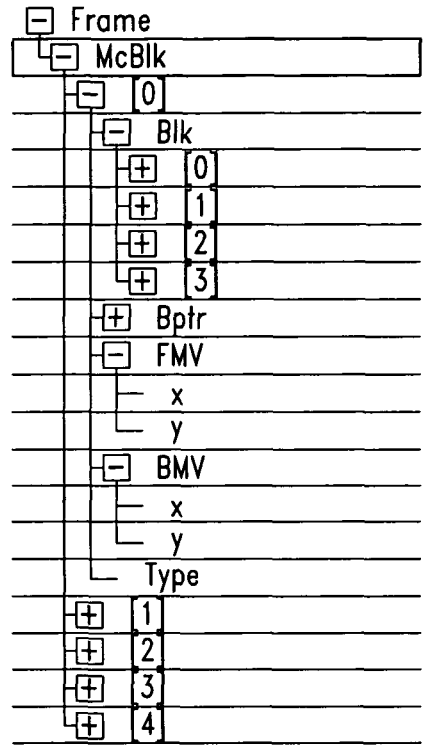
Figure 6:
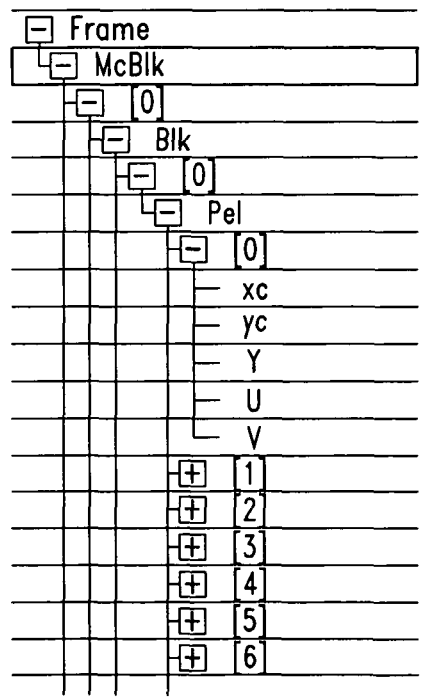

The data structure of the VBO 162 as regards the video is the one represented in FIG. 5. Each of the blocks (Blk) is expandable and is made up of a set of 64 PELs, as illustrated in FIG. 6. As may be noted, each PEL has the three color coordinates and the two two-dimensional pixel-center coordinates xc and yc, computed previously on the basis of the dimensions of the frame and position of the PEL.

After the first stage, this structure, which initially was empty, contains frame by frame, and macroblock by macroblock the motion data; i.e., the coordinates x and y of the forward motion vectors (FMVs) and backward motion vectors (BMVs) and the quantization coefficient are known. For each PEL we have the coordinates xc and yc, and contained in the Y,U,V fields are the values regarding the color, which, however, are further processed in order to obtain the real color prediction errors.

The first transformation that they must undergo is the inverse quantization, a process that is entrusted to the second stage, i.e., the geometrical stage 154.

The geometrical stage (Geometry & Pre-process) 154 performs the geometrical transformations and the effects of light at the vertices constituting the various primitives (points, lines and triangles). What it receives at input is hence a set of data, i.e., the coordinates of each vertex, and it returns them transformed at output signaling which of them are visible, an operation that is very useful in order to decrease the computational burden of the next stage.

In order to carry out inverse-transform operations necessary for video decoding, the capacity of this stage for working with vectors of dimensions [4×1] and matrices of dimensions [4×4] is exploited, as well as the capacity for identification of the data that are not to be sent to the next stage, given that said data are not necessary for the construction of the 3D scene, but constitute an intermediate processing stage.

Figure 7:
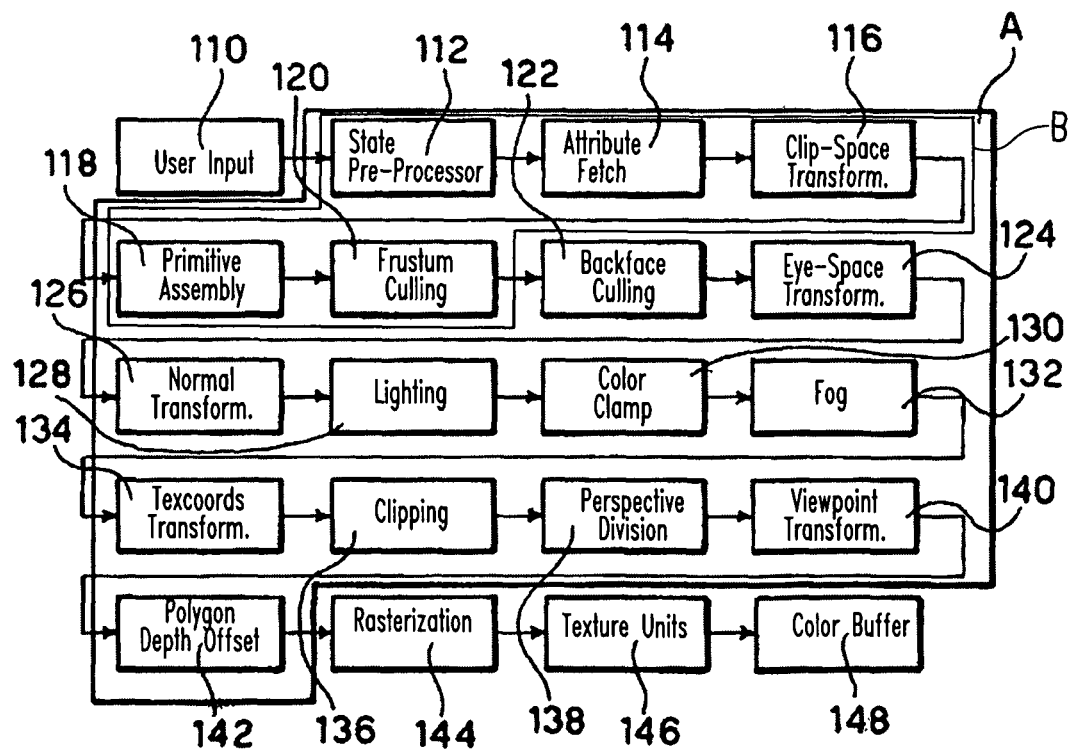
FIG. 7 is a diagram that refers back to FIG. 2 in the representation of the flow of information in the system described herein.

In FIG. 7, the frame A highlights the part of pipeline regarding the geometry stage whilst the frame B highlights the Blocks 112, 114, 116, 118 and 120 directly involved in the operations.

There now follows a description of the inverse-quantization process.

The geometrical stage 154, as has been said, expects at input a vector containing the values that represent the coordinates of the vertices to be processed. As regards the graphics, this operation is performed using two APIs: the first specifies the location of the data, the number of elements that constitute a single vertex, and the type of data, and the second, starting from this set of client-side information, enables the functions thereof.

The APIs in question, for which the reader is referred to the OpenGL ES 1.0 specifications, are the following:
 void glVertexPointer(GLint size, GLenum type, GLsizei stride, const GLvoid * pointer)
 void glEnableClientState(GLenum array).

The modifications at the level of definition of the APIs, as regards video, consist in the definition of a new API for the creation of the client-side information and a new enumerator for the second API which carries out enabling thereof:
 void glQDCTPointer(GLint size, GLenum type, GLint intra, const GLvoid * pointer)
 Parameters:
 GLint size: this is chosen equal to 4, the maximum dimension of a vertex vector, which in this case contains 4 values to be inversely quantized;
 GLenum type: this is chosen equal to GL_FLOAT;
 GLint intra: this is chosen equal to 0 (non-intra) or else equal to 1 (intra) to select the right inverse-quantization process for the different types of pictures;
 GLvoid * pointer: this specifies the pointer at the first coordinate in the QDCT array to be processed;
 void glEnableClientState(GLenum array)
 Parameters:
 GLenum array: in this case the new enumerator GL_QDCT_ARRAY is used.

The API that performs the set-up of the client state regarding the vector containing the data to be processed as last parameter requires a pointer, usually entered by the programmer who writes the application. In the case of video decoding, these data reside already in the VBO 162; hence, in order to pass the correct pointer, a Get operation is carried out on the video context.

The elements of the video structure of the context are of two types, integers and pointers to the data areas of the VBO; hence, in general, two different Get operations for the different types will be necessary.

These APIs are derived from the existing ones for the graphics by means of an enrichment of the parameters and, as regards the code, by inserting the corresponding cases, which read the contents of the context:
 void glGetIntegerv(GLenum pname, GLint *params)

Parameters:

GLenum pname: this specifies the parameter that it must return and, according to the cases, is: GL_VIDEO_GOP, GL_VIDEO_WIDTH, GL_VIDEO_HEIGHT, GL_VIDEO_MBNUM;

GLint *params: this returns the value of the previous parameter, i.e., an integer;

GLubyte * glGetString(GLenum name)

Parameters:

GLenum name: this specifies which parameter (of a pointer type) it has to return. According to the various cases, it should be: GL_VIDEO_PICTYPE, GL_VIDEO_YDATA, GL_VIDEO_UDATA, GL_VIDEO_VDATA, GL_VIDEO_MBTYPE, GL_VIDEO_MBQUANT, GL_VIDEO_FMV, GL_VIDEO_BMV.

In this way, also for operations that will follow the inverse transformations, it is possible to control and fetch the data on the entire video context.

Up to now, setting of the client state regarding the data to be inversely quantized, at the picture level, has been carried out. Now, for each macroblock of the picture, operation proper is carried out in groups of four elements at a time. The first action consists in a GetIntergerv in order to recover the pointer that contains the values of the quantization coefficient of the macroblocks, and, through a counter, select the value of the current macroblock, after which generation of the diagonal [4×4] matrix that will process the contents of the [4×1] vector is performed, in order to execute the inverse quantization.

The two [4×4] matrices, i.e., the ModelView matrix and the Projection matrix, from the product of which the final transformation matrix will be obtained, are initialized with the identity matrix and saved in the stack through push operations with the classic APIs and standard graphics functions:

void glMatrixMode(GLenum mode)
void glLoadIdentity(void)
void glPushMatrix( ).

Next, these two matrices will then have to be personalized each time. At the macroblock level, the identity matrix extracted with a Pop operation will now be scaled by means of a new API, deriving from the existing one, which applies scalings to the matrices. At the level of a [4×1] vector, hence of elements of the block, the ModelView matrix will now be modified, once again via scaling.

When multiplying the two matrices together, the Projection matrix will contain on its diagonal the quantization coefficient of the macroblock, and the ModelView matrix will contain the values of the quantization matrix.

Said matrix multiplication occurs in the Pre-processing block, where, on a context basis, operations that are to be carried out by the subsequent blocks are established. In this case, it is evaluated whether the contents of the two matrices in question have varied and if so the multiplication is carried out to obtain the current transformation matrix to be applied to the vertex (the [4×1] vector).

The transformation process carried out by the geometrical stage 154 is activated with the standard API:

void glDrawArrays(GLenum mode, GLint first, GLsizei count).

The block Clip & Space Transform 116 (FIG. 2) takes the current matrix and applies it to the [4×1] vertex vector, which has been filled with the current data by the fetch block, and executes the transformation of the vertex, which in this case corresponds to inverse quantization.

Next, since a vision window and a scissor window have not been set, the block Frustum Culling 120, for each primitive (set of vertices), will decide that it is not necessary to proceed with rendering, in so far as said primitives are all out of sight, thus saving operations and not writing anything in the frame buffer. The processed data consequently return to the VBO 162.

The new API for scaling the matrix is the following:

void glScale4f(GLfloat x, GLfloat y, GLfloat z, GLfloat w).

This API derives from one that originally enables a non-uniform scaling along the three main axes x, y, z, given that w is set at 1. For the video it recalls the same module of the pipeline, passing thereto a further parameter w different from 1, so as to apply a scaling with four elements, which now no longer represent the vertex coordinates, but are four elements to be transformed.

This means that the current matrix (in this case either the Model matrix or the Projection matrix) is taken and is multiplied by the following matrix:

$$\begin{bmatrix} x & 0 & 0 & 0 \\ 0 & y & 0 & 0 \\ 0 & 0 & z & 0 \\ 0 & 0 & 0 & w \end{bmatrix}.$$

The result of the inverse quantization is the following set of operations:

$$\begin{bmatrix} Q & 0 & 0 & 0 \\ 0 & Q & 0 & 0 \\ 0 & 0 & Q & 0 \\ 0 & 0 & 0 & Q \end{bmatrix} * \begin{bmatrix} C1 & 0 & 0 & 0 \\ 0 & C2 & 0 & 0 \\ 0 & 0 & C3 & 0 \\ 0 & 0 & 0 & C4 \end{bmatrix} * \begin{bmatrix} v1 \\ v2 \\ v3 \\ v4 \end{bmatrix} = \begin{bmatrix} v1 \\ v2 \\ v3 \\ v4 \end{bmatrix}$$

where Q is the quantization coefficient of the macroblock, and Ci are the values of the quantization table already normalized for the two cases of intra block or non-intra block.

This type of operation, carried out with structures capable of making multiplications in parallel, hence capable of managing matrices and vectors, uses the same operations as the algorithm that executes the same function in the video decoder, as illustrated in the following table:

|  | # shift | # sum | # mult | # or | tot |
|---|---|---|---|---|---|
| MPEG 2 | | | | | |
| tot per IntraBlock: | 1 | 65 | 189 | 1 | 256 |
| tot per NonIntraBlock: | | 128 | 256 | 1 | 385 |
| GFX | | | | | |
| tot per IntraBlock: | | 64 | 192 | 1 | 257 |
| tot per NonIntraBlock: | | 128 | 256 | 1 | 385 |
| GFX Optimized (only for default quant matrix mode) | | | | | |
| tot per IntraBlock: | | 64 | 128 | 1 | 193 |
| tot per NonIntraBlock: | | 128 | 192 | 1 | 321 |

In the table, "shift", "sum", "mult" and "or" designate the corresponding operations, with reference to a normal MPEG2 decoding, and to the case of a GFX pipeline. The last set of data (optimized GFX) regards a simpler and optimized way to execute the method, only in the case where the matrix of the block quantization coefficients is that of default, as in the majority of cases occurs.

The next operation, once again entrusted to the geometrical stage 154, is the inverse discrete cosine transform (IDCT) to apply to the data just obtained by means of the inverse-quantization process.

This operation may be implemented in different ways that are more or less efficient.

Figure 8:
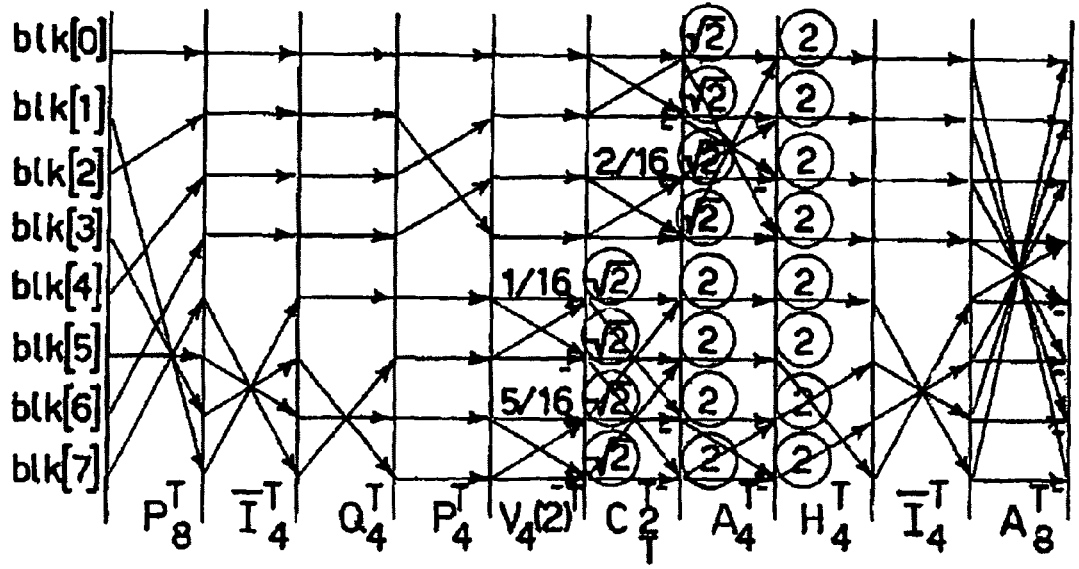
FIG. 8 is a diagram representing the Chen Wang algorithm for the discrete cosine transform (DCT) as implemented in the system described herein.

The standardizing body, in the implementation of its MPEG2 decoder, uses the optimized Chen-Wang algorithm for the inverse discrete cosine transform, which, without going into further detail, may be represented schematically as in the well known representation appearing in FIG. 8.

Each step consists in the execution of simple operations of addition, multiplication or else shift, and the entire process must be performed for all the rows of a single [8×8] block and subsequently for all the columns of the [8×8] block that contains the previous results. In this way, by means of a separable IDCT, the inverse transformation is obtained in a fast way.

From the scheme outlined above it may be noted how, after a first step, which is a simple ordering and scaling of the individual components, in effect up to the last step the two paths that the top four elements follow can be divided from the bottom four, which once again fits in well with the capacity of the graphics pipeline to operate with [4×1] vectors and [4×4] matrices.

The first step, by shifting the scaling further downstream, is nothing other than writing of the four coefficients of even index in one vertex vector, and of the four odd coefficients in another vertex vector. These two 'vertices' are each multiplied by a different [4×4] transformation matrix, given that the two paths in the scheme are separate and independent, and then the end result is a 'butterfly' between the two resultant vectors, i.e., a series of additions or subtractions between the elements of the vectors, which can also be obtained using matrix operations.

Figure 9:
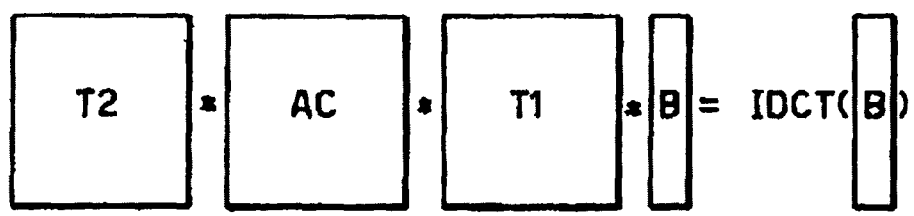
FIGS. 9 and 10 are schematic representations of processes implemented in the system described herein.

The entire process may be summed up as in FIG. 9.

The IDCT(B) transform of an [8×1] vector B is the application to said vector B of an [8×8] matrix, which is in turn made up of three matrices: T1, which is a first ordering matrix; AC, which is a particular matrix that can in turn be broken down into two full matrices and two zero matrices; and T2, which is the matrix that creates the final butterfly.

Once the IDCT of an [8×8] unitary matrix 18 is known, it is possible to start from this result to arrive at the decomposition of the generic [8×8] matrix that performs the generic IDCT, using as input an [8×1] vector B taken from one of the columns of the identity matrix.

The following writing is thus obtained:

$$T2*AC*T1*B=IDCT(18)*B \rightarrow T2*AC*T1=IDCT(18).$$

Inverting the matrices T2 and T1, by means of pre-multiplication and post-multiplication, we obtain:

$$AC=T2^{-1}*IDCT(18)*T1^{-1}.$$

Figure 10:
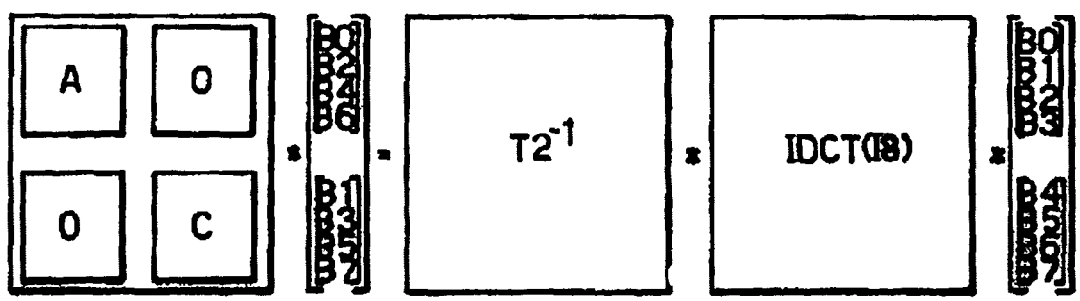

Recalling the decomposition of the [8×1] vector into two [4×1] vectors, it is possible to obtain the decomposition of the matrix AC also eliminating the matrix T1 and writing the even and odd coefficients in the two separate vectors as in FIG. 10.

It is possible to consider multiplying instead of an [8×1] vector, an [8×8] matrix obtained by setting 8 of the preceding vectors alongside one another. Hence, by means of a multiplication of two [8×8] matrices, the IDCT of all the rows of a block is performed in just one go. Translated into [4×4] multiplications, as has just been explained above, we have 8 matrix multiplications.

Also in this case, given in what follows is the comparison in terms of operations ("shift", "sum", "mult") between the GFX pipeline and the MPEG decoder.

|                 | # shift | # sum | # mult | tot |
|-----------------|---------|-------|--------|-----|
| MPEG 2          |         |       |        |     |
| per Row:        | 12      | 32    | 11     |     |
| per Col:        | 18      | 35    | 11     |     |
| tot per Block:  | 240     | 536   | 176    | 952 |
| GFX             |         |       |        |     |
| per Row:        |         | 24    | 32     |     |
| per Col:        |         | 24    | 32     |     |
| tot per Block:  |         | 384   | 512    | 896 |

From an analysis of the results of the operations necessary for processing a single block, it may be noted that, against an increase in the number of multiplications, there is a reduction in the number of additions and a total elimination of shift operations.

As a whole, once again for a single block, it may be seen that the total sum of the individual operations performed is reduced by a percentage value of 6.25 with respect to the process implemented in the MPEG decoder taken as reference for the comparisons.

The three [4×4] matrices obtained from the decomposition explained previously are the following:

$$A = \begin{bmatrix} 0.3536 & 0.3536 & 0.1913 & 0.4619 \\ 0.3536 & -0.3536 & -0.4619 & 0.1913 \\ 0.3536 & -0.3536 & 0.4619 & -0.1913 \\ 0.3536 & 0.3536 & -0.1913 & -0.4619 \end{bmatrix}$$

$$C = \begin{bmatrix} 0.4904 & 0.0975 & 0.2778 & 0.4157 \\ 0.0975 & -0.4904 & 0.4157 & -0.2778 \\ 0.4157 & -0.2778 & -0.4904 & -0.0975 \\ 0.2778 & 0.4157 & 0.0975 & -0.4904 \end{bmatrix}$$

$$F = \begin{bmatrix} 1 & 1 & 0 & 0 \\ 1 & -1 & 0 & 0 \\ 0 & 0 & 1 & 1 \\ 0 & 0 & 1 & -1 \end{bmatrix}.$$

As regards the client end, some standard APIs are used to carry out the IDCT operation, which enable these three matrices to be loaded, and a new one, which performs the matrix multiplications in the right order. This employs as input a pointer to the data structure present in the VBO 162 (but not necessarily), which in this case is the result of a Get operation on the video context, as illustrated previously. There then follows a series of multiplications, which are performed with the standard OpenGL ES functions, exactly in the same manner that would be set at the client end with the API glMultMatrix( ) (hence without any modification of the algorithm).

In this case—since it is a series of multiplications—the control and set-up of the context passes directly to the server, which constructs the series of actions useful for performing the IDCT first on the rows and then on the columns, returning at the end of the process the values obtained in the same structure of the VBO 162 in which it has fetched them.

The sequence of operations with the standard APIs is the following:
 void glMatrixMode(GLenum mode)
 void glLoadMatrixf (const GLfloat * m).

It is repeated for three times using the pairs (GLenum mode) and (const GLfloat * m) for loading the matrices A, C, and F in GL_PROJECTION, GL_MODELVIEW, and GL_TEXTURE, respectively.

The description of the new API for the two-dimensional IDCT is:
    void glIDCT2 (GLvoid * pointer)
    Parameters:
    GLvoid * pointer: this specifies the pointer to the first coordinate of the array to be processed.

Starting from the third stage, i.e., the rasterizer 156, the creation of the image proper in the frame buffer starts.

Before looking at what happens in this stage, it is useful to bear in mind that there exists a step of creation of the 3D scene, to be submitted to the geometrical stage 154, which, after various processing operations, will present to the rasterizer 156 a series of primitives to be transformed into pixels in the frame buffer.

A first step consists in the initialization, i.e., in the set-up, of the viewport, of the scissor area, of the position of the camera (by means of some glu functions, i.e., GL utilities), and in the creation of a first reference texture to be used as predictor for the colors of the intra macroblocks. This is nothing other than a small texture having the size of one pixel, which as values has 128 for RGB and 0 for A. To each texture generated in the texture memory 164, by means of a binding operation an identifier, i.e., an integer number, is associated. The texture just generated will assume also without binding the default value 0.

The standard APIs used in this step are the following:
    void glClearColor(GLclampf red, GLclampf green, GLclampf blue, GLclampf alpha)
    void glViewport(GLint x, GLint y, GLsizei width, GLsizei height)
    void glScissor(GLint x, GLint y, GLsizei width, GLsizei height)
    void glEnable(GLenum cap)
    void glBindTexture(GLenum target, GLuint texture)
    void glTexImage2D(GLenum target, GLint level, GLint internalformat, GLsizei width, GLsizei height, GLint border, GLenum format, GLenum type, const GLvoid * pixels)
    void glDisable(GLenum cap).

From this moment on creation of the images begins. For each frame, by means of the classic API glVertexArray and its Enable it is established where the data structure to which reference is to be made for creation of the primitives is located. The pointer that is passed to said API is simply the result of a Get on the video context, which returns the location in the VBO 162 of the elementary mesh of triangles that is to be used to build each frame.

Figure 11:
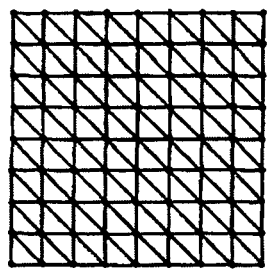
FIG. 11 is a geometrical representation of a block in the form of a mesh of elementary triangles.

The following operations are translations for composing, starting from the basic mesh element (a series of triangles that represents the block), the complete structure of the frame. The mesh of elementary triangles that represents geometrically a block is illustrated in FIG. 11.

There may be noted the structure made up of vertices, the black dots and the primitives, i.e., set of vertices, and the grey triangles. Each pair of primitives, i.e., four vertices, identifies a video PEL.

The entire frame, at a geometrical level, will be obtained by setting alongside one another the right number of these elementary elements. In order to cause this structure to become a frame, i.e., a two-dimensional image, not only is the geometrical context generated for the geometrical stage 154, but associated with each vertex is a color coordinate, so that the rasterizer 156, when creating the fragments (set of pixels of the frame buffer) can assign the corresponding colors.

Figure 12:
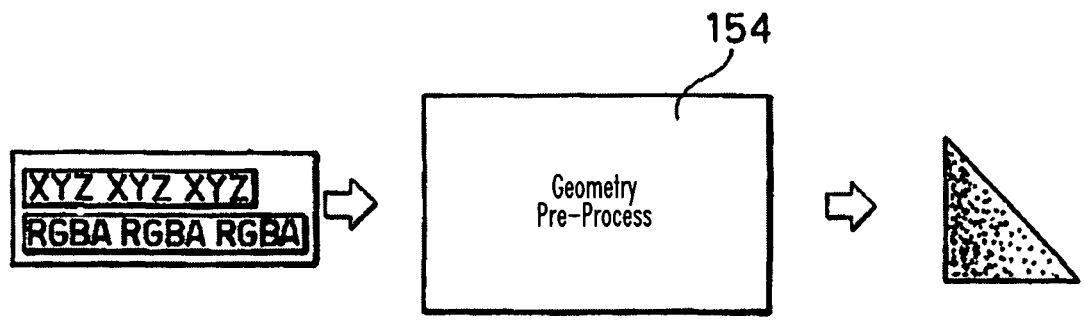
FIG. 12 is another schematic representation of a process implemented in the system described herein.

The rasterizer 156 performs two functions: given the vertices that form the individual primitive, it interpolates all the other geometrical values (coordinates of each individual pixel of the primitive); and, given the color coordinates for each vertex, it calculates the color of each individual pixel by means of an interpolation. A simple example of the process is illustrated in FIG. 12.

A first modification introduced in this step, for emulating correctly the process of video decoding, is that of a different clamping (130' of FIG. 13) of the colors that have passed to the pipeline through the standard API glColor4f, i.e., the function at the client end that decides the color coordinates to be associated to the vertex.

Figure 13:
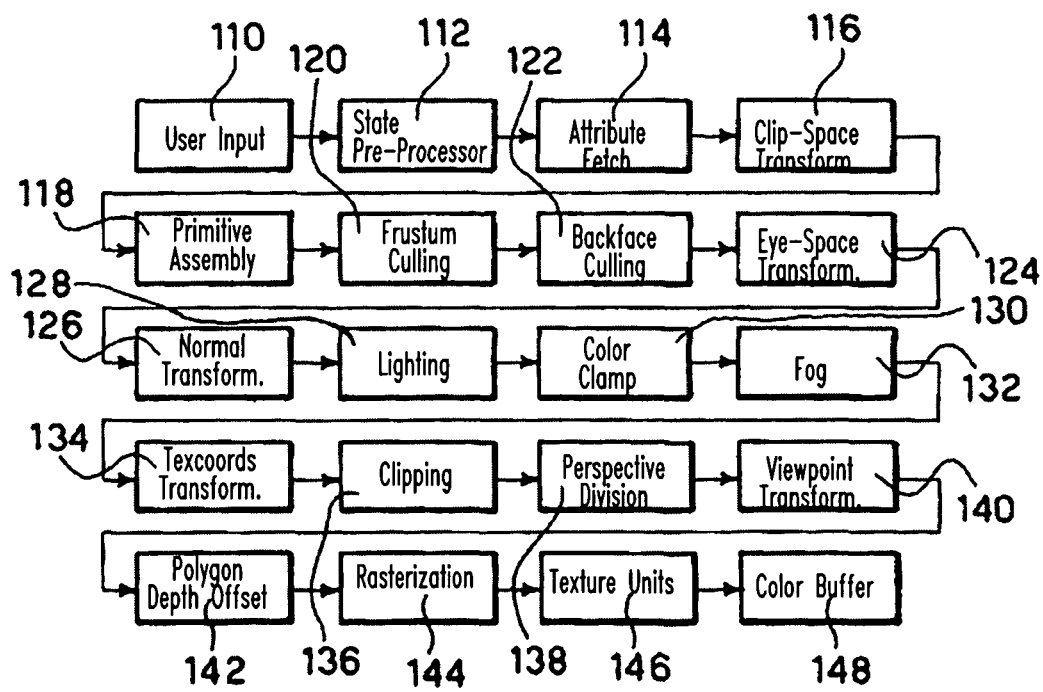
FIG. 13 is yet another diagram that refers back to FIGS. 2 and 7 in the representation of the flow of information in the system described herein.

With reference to FIG. 13, the Block 130' in question may be noted, which has the task of fetching the color data at the client end, which vary in a range [0-255], and of converting them into the internal format [0-1] setting any negative value at 0 and the values that exceed 255 at 1.

Given that the color coordinates, which in the video framework have passed to the graphics pipeline by means of the API mentioned above, represent the prediction errors resulting from the inverse transformation process, they can be and remain negative.

If from the graphics standpoint, it is reasonable to think of setting each negative value to zero, from the video standpoint this choice is not a good one since the final color is the sum of a prediction error and a predictor; hence the sum must be positive, whereas the prediction-error value may not.

The modification regarding the block in question has been introduced by means of a simple check on a flag of the video context, c?video?enabled. If the latter is disabled, the pipeline will behave in the manner envisaged for graphic operations; if it is enabled, the clamping range will become [−1-1]. In this way, it is possible to assign also negative values as regards the RGBA color coordinates. Associated with the channel R is the value of Y, with the channel G is that of U, with the channel B is that of V, and the Alpha channel for the moment is not used.

By assigning a set of four RGBA values which is always the same for the four vertices that identify a geometrical PEL, and passing everything on to the rasterizer, the part of frame buffer that represents it is obtained, and by so doing for all the PELs, in the frame buffer the pictures constituted by just the prediction errors are obtained.

This operation is performed through the use of the standard API glColor4f, and the parameters that have been passed thereto are the ones contained in the VBO 162, in the structure frame? macroblock? block? pel? Y,U,V once again by means of a pointer obtained by means of a Get operation on the video context.

As regards the role of the stage 158, i.e., the texture units, it will be appreciated that from this moment on processing of the contents of the frame buffer follows different paths according to the type of pictures that is to be reconstructed.

In any case, the subsequent block that sees to the final generation of the pictures is the texture unit, or rather the texture units 158, seeing that the OpenGL ES standard envisages at least two of them, which proves useful since one will manage reference to the previous picture, the other one reference to the next picture, thus meeting the requirements of decoding with bi-directional motion compensation.

The simplest case, which does not envisage motion compensation is that of the pictures of an Intra type, i.e., the ones that are not predicted starting from others and that do not present the problem of motion compensation of the blocks. The only operation is a prediction with respect to a fixed value, at the center of the scale of the range of colors (128); hence each individual fragment that comes out of the rasterizer is, pixel by pixel, added to said value in all its RGB or else YUV color components. The rasterizer 156 is able to work with negative numbers in the range [−1-1], but the texture unit or units 158 is/are not able to do so.

They assume at input the color value of the pixel to be processed, transformed again in the range [0-255], and, on the basis of the texture coordinates associated to the vertices of the primitive, through the API glTexCoorPointer, recover the value of the color to be added to the input one. The value recovered is the reference value, i.e., a value that is always positive; instead, as has been said, the input value could be negative, in so far as it represents the prediction error.

In order to solve this problem of the sign of the color value at input, the modification applied to the texturing block is that of fetching the absolute value of each color coordinate at input, separately for the three RGB channels, whilst the sign of the individual components is encoded in the Alpha channel. These modifications, as always, are active in the case where the flag c?video?enabled is active.

At the moment when the reference is added to the current input value, according to the particular configuration of the value of A, the texture unit involved is able to decide for an addition or else for a subtraction, whilst in the standard case of graphics it always performs an addition.

Once this operation has been performed for all the fragments, the image (picture) generated in the frame buffer is equal to the one at output from the video decoder, and the subsequent step is to save it in the texture memory 164 since it will have to function as reference for the subsequent images/frames to be decoded.

Since, in the Intra pictures, all the blocks are Intra and do not need any motion compensation, the texturing method, apart from the problem of the sign, is carried out without any further modifications with respect to a standard graphics texturing, using the APIs:

void glEnable(GLenum cap)
void glDisable(GLenum cap)
void glBindTexture(GLenum target, GLuint texture)
void glEnableClientState(GLenum array)
void glDisableClientState(GLenum array)
void glTexParameterf(GLenum target, GLenum pname, GLfloat param)
void glTexEnvf(GLenum target, GLenum pname, GLfloat param).

The last two APIs are necessary for defining the parameters of the texturing operations and as last parameter have the values, respectively, GL_LINEAR and GL_ADD; i.e., the color recovered by the texture unit 158 is filtered linearly between the neighboring ones, in the case where the texture coordinates do not fall exactly on a pixel of the texture and the texturing process is an addition (it could also be a replace operation, a blending, etc.).

These parameters, especially GL_LINEAR, take on a certain importance in the process of motion compensation, in so far as the texture unit 158 uses the same type of filtering, namely, the bilinear filtering that is used by the process of MPEG decoding.

Figure 14:
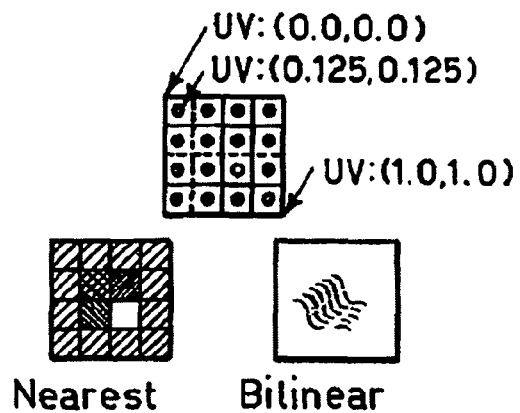
FIGS. 14 to 16 are various schematic representations of processes implemented in the system described herein.

FIG. 14 illustrates an example of this process of construction of the reference color, as compared to the "nearest" method, i.e., nearest to the position of the texture coordinates.

Figure 15:
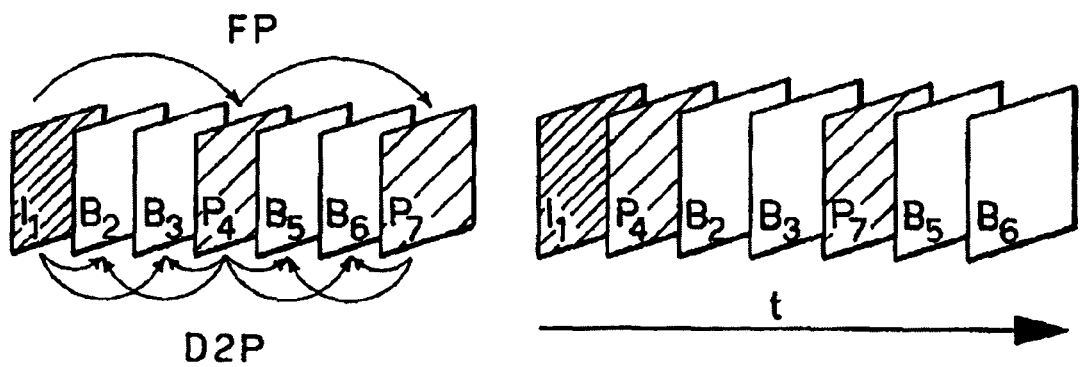

The second frame to be constructed will certainly be a Predicted picture (P), and in this case the blocks that make it up can be of a different nature, i.e., Intra, Forward Prediction (FP), with and without motion compensation, and skipped: see in this connection FIG. 15, where the reference D2P designates the bi-directional prediction and t designates in general the time scale.

The intra blocks undergo the same processing explained previously, whilst the others must undergo a process of motion compensation; i.e., starting from two coordinates contained in the VBO 162 present in frame?macroblock-?block?pel?xc,yc, and other two present in frame?macroblock?FMV?x,y, the method calculates the exact texture coordinates for recovery of the color reference in the previously saved texture (the frame I) to be able to generate the exact current color.

Figure 16:
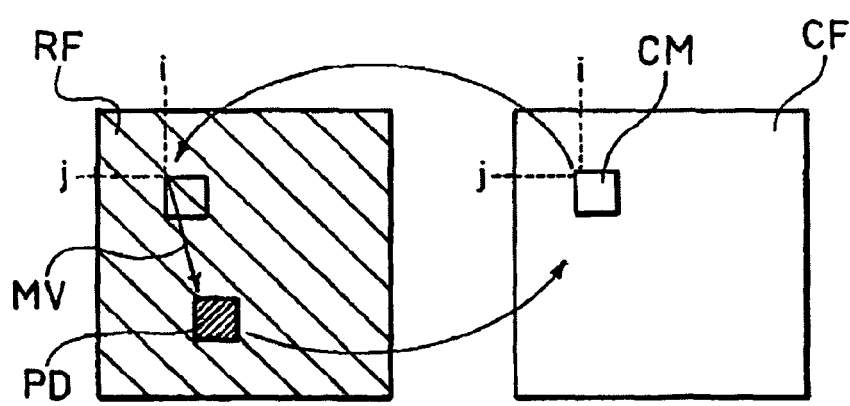

The process of motion compensation is represented by the diagram of FIG. 16, where RF designates the reference frame (I or P) and CF designates the current frame (P or B). Represented in the reference frame RF are a motion vector MV and the predictor PD associated thereto. In the current frame CF a current macroblock is represented. The coordinates xc and yc represent the PEL center coordinates (appearing in the figure are the various pairs i, j), and x and y are instead the values of the motion-compensation vector MV.

It will be appreciated that FIG. 16, regarding the process of motion compensation and the concept of motion vector, may also be viewed as representing the texturing process and the concept of texture coordinates: the only differences are represented by the fact that the origin of the reference system in the case of graphics is at the bottom left, whereas for the video it is at the top left.

This in effect means that, in order to pass from one system to another, it is sufficient to reverse the direction of the axis of the abscissa and subtract/add to the origin the respective value of the ordinates.

Figure 17:
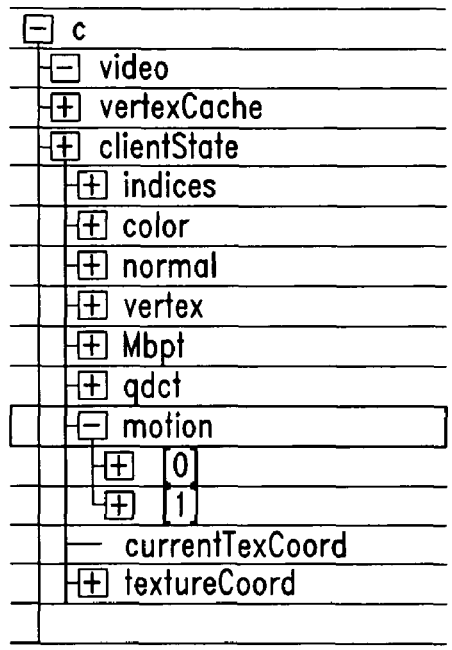
FIGS. 17 and 18 represent further context structures that flow in the pipeline of the system described herein.

In order to pass from the data just seen, i.e., from the position of the PEL and from the motion vector, the context is consequently modified adding by a new API for the set-up of this new structure inserted in the client state, as illustrated in FIG. 17.

Figure 18:
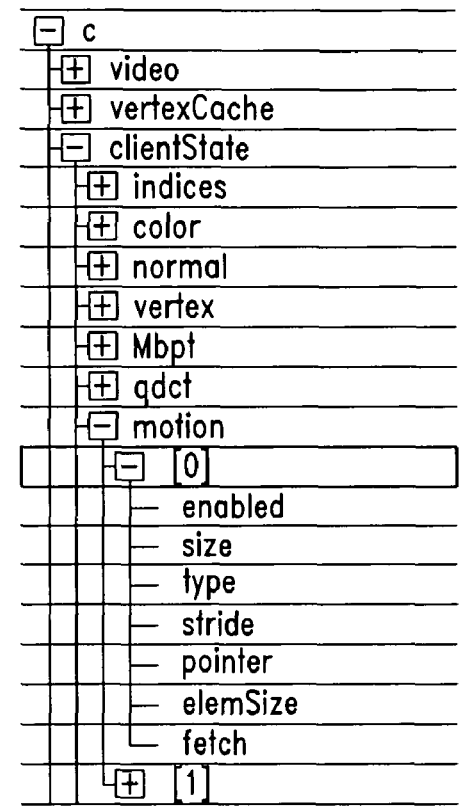

The motion structure is made up of two equal parts because for the two-dimensional motion compensation there are the data on two references, i.e., forwards (forward motion vector) and backwards (backward motion vector): see also FIG. 18. With the exception of the first parameter, it may be noted that the data structure of the context is identical to all the others regarding the arrays at the client end that have been passed to the graphics pipeline (vertex, color, normal, etc.); i.e., they contain the information regarding the dimension and type of the basic element of the array, and the pointer to the first element.

This structure is filled through the use of the following purposely created API:

void glMotionPointer (GLint size, GLenum type, GLsizei prec, const GLvoid *pointer);
Parameters:
GLint size: this is chosen equal to 2, the maximum dimension of a motion vector (x,y);
GLenum type: this is chosen equal to GL_FLOAT;
GLint prec: this is chosen equal to or greater than 1 and is the precision of the motion vector, in terms of fractions of pixels; For example 1=1 pixel, 2=half a pixel, 4=quarter of a pixel;
GLvoid * pointer: this specifies the pointer to the first coordinate of the array.

Once again, the last parameter is the value of a pointer to a data structure contained in the VBO 162, to be derived by means of a Get operation, with the purposely defined API. This is not a constraint given that the information not necessarily must be that of the VBO 162, but any pointer at the client end can be used for specific applications.

The last data for the method of motion compensation are the ones regarding the position of the center of the PEL, which are passed as texture coordinates through the standard API:

void glTexCoordPointer(GLint size, GLenum type, GLsizei stride, const GLvoid * pointer)
and its functions are enabled at the client end by means of:
void glEnableClientState(GLenum array).

The new enumerator for the motion array will be GL_MOTION_ARRAY, whilst the other for the texture coordinates is the standard GL_TEXTURE_COORD_ARRAY.

By means of the following APIs, with the parameters set as explained previously, the reference texture on which to apply the texture coordinates that will be obtained from the process of motion compensation is set:
void glBindTexture(GLenum target, GLuint texture)
void glTexParameterf(GLenum target, GLenum pname, GLfloat param)
void glTexEnvf(GLenum target, GLenum pname, GLfloat param).

Figure 19:
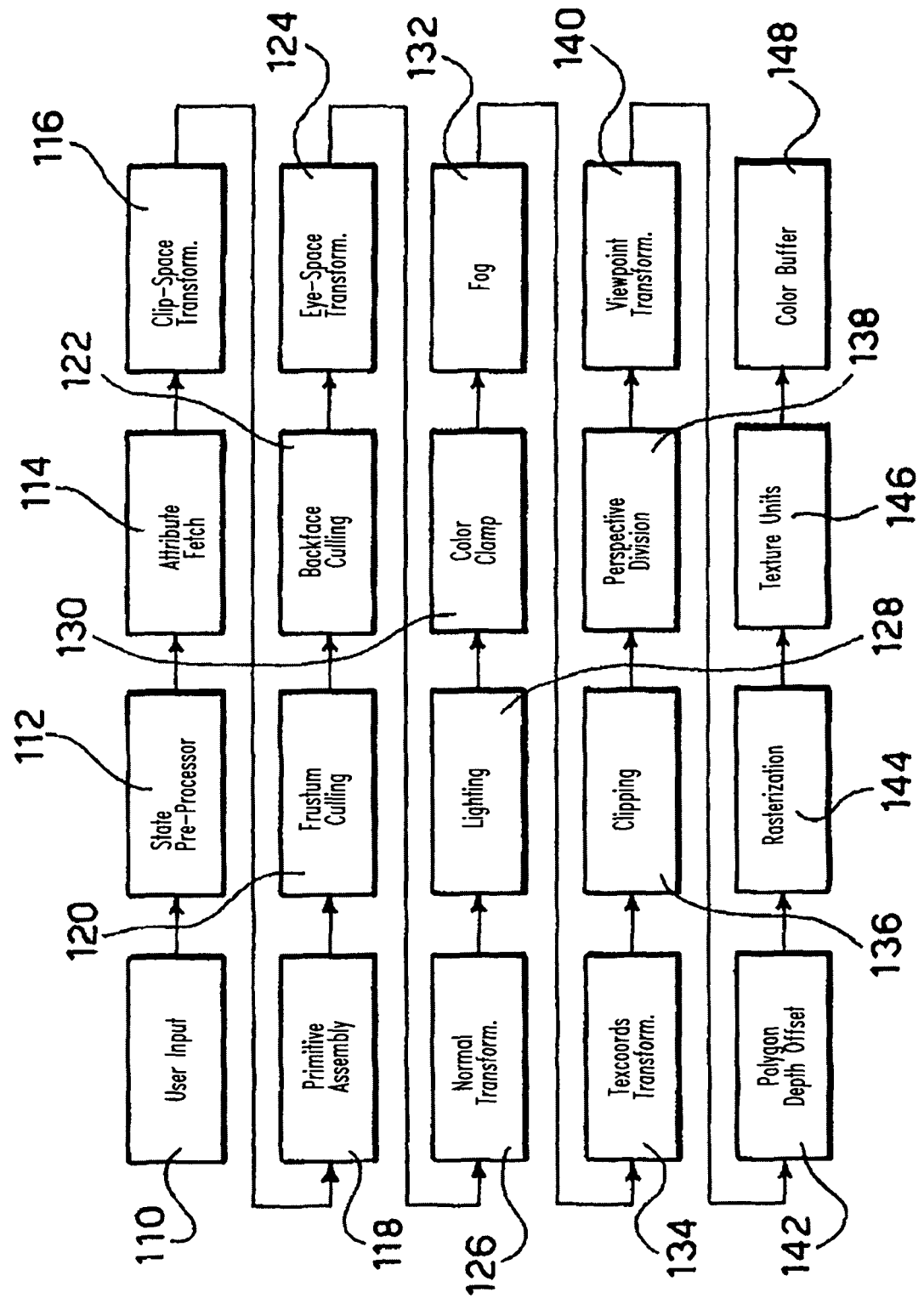
FIG. 19 is yet a further diagram that refers back to FIGS. 2, 7 and 13 in the representation of the flow of information in the system described herein.

The method of creation of the texture coordinates consists in the two following operations to be performed for each PEL:

$$TC.x=[xc+(MV.x/Prec)]/TextureWidth$$

$$TC.y=[yc-(MV.y/Prec)]/TextureHeight$$

xc and yc are already contained in the Texture coords array (TC.x and TC.y), and the result remains in said location in so far as it is the vector that contains the coordinates that will be used by the Texture Unit to recover the reference. This operation occurs in the step of pre-processing of the texturing operations and as always is subject to a check on some flags of the video context to prevent interference with operations of the graphics. Highlighted in FIG. 19 is the Block 134 in question, which is entrusted with this processing of the texture coordinates.

The modifications proper regarding the texture unit 158, as regards the individual texturing, used in the one-directional motion compensation, as in this case, regard conversion of the input data on the current color of the fragment to be textured and check of the sign upon addition of the reference.

The first aspect may be dealt with by adopting a simple solution. At output from the rasterizer 156 there is a value for each color coordinate, in the case of the video, belonging to the range [−1.0-1.0], whilst the texture unit 158 accepts only values comprised within the range [0-255]. The standard envisages a converter that passes from [0.0-1.0] to [0-255] hence in the case of the video the method passes the sign without altering the range [0-255], in order not to have to redesign all the texture units 158. An advantageous way to do this is to take the absolute value of the output of the rasterizer 156, converting it into the corresponding one of the range of the texture unit and encoding the sign in the Alpha channel. This is possible because the color space of the video envisages three values, YUV, whilst that of the graphics four, RGBA. If RGB contain the values of YUV, the Alpha channel is free and can be used for this purpose.

In this step the value of Alpha is calculated as follows:

$$A=\text{sgn}(R)*10^2+\text{sgn}(G)*10^1+\text{sgn}(B)*10^0$$

where sgn(c) is equal to 1 if the sign of the color value is negative and 0 otherwise. In this way, all the possible combinations of the signs are readily identified and in the texturing step are identified with add or sub ifs.

Once writing of the frame buffer has terminated, everything is saved as a new texture, and it is possible to proceed with the subsequent frame, the bi-directional picture (B), which involves multitexturing and hence some modification with respect to the processing just described.

All the operations described above are carried out once again, and the method diverges therefrom starting from the point in which it is established at the client end what is the array of the motion vector. In this case, the context structure that hosts said data is filled by using the API shown previously twice; in fact, for each block, if this is predicted bidirectionally, two motion vectors are needed, one for each texture unit.

For each of the two units the parameters are set as described for the single texturing by previously activating each time the right unit for building the different contexts for each of the two units, by means of the standard APIs:
void glActiveTexture(GLenum texture)
void glClientActiveTexture(GLenum texture).

The conversion from motion vector to texture coordinates is performed as already seen, for each of the units, and also the process of conversion of the negated values does not vary.

The main difference lies in the fact that the texture unit 158, being informed by the context that it is in the video mode and moreover that multitexturing is being carried out, will halve the result, which is returned by the reference texture image before adding it to or subtracting it from the color of the fragment, according to what is envisaged by the video specifications.

Furthermore, given that in this case the result after the first texturing is still an intermediate result and could present a negative value, the texture unit 158 encodes the sign of the various color channels in Alpha as has been seen previously, with the following variation:

$$A=\text{sgn}(R)*2*10^2+\text{sgn}(G)*2*10^1+\text{sgn}(B)*2*10^0$$

The method proceeds in this way until all the pictures have been decoded and saved in the texture memory 164.

At this point, operating in the correct order of display—which is different from that of decoding, the pictures can be copied in the frame buffer and displayed as film, after having undergone a final processing, pixel by pixel, on the color format.

In fact, the contents of the texture memory 164 are represented by a series of pixels in the RGBA format, with the Alpha channel disabled, but in actual fact are in the YUV format. Displaying them as they are, the result could be different from what is expected, precisely on account of the color format.

To prevent this from happening, it is sufficient to eliminate the constraint set by OpenGL ES, which envisages that a texture has the same internal format as the external one. To obtain a better understanding of this concept, useful reference may be made to one of the APIs in question:
void glTexImage2D(GLenum target, GLint level, GLint internalformat, GLsizei width, GLsizei height, GLint border, GLenum format, GLenum type, const GLvoid * pixels).

The two parameters in question are:
GLint internalformat
GLenum format.

The OpenGL ES specifications envisage that these two parameters will assume the same value on the basis of the result that it is wished to obtain. The possible choices may be one of the following:
GL_ALPHA, GL_RGB, GL_RGBA, GL_LUMINANCE, or else GL_LUMINANCE_ALPHA.

It may be noted that the YUV color format is not supported. Consequently, a new enumerator GL_YUV is defined to identify the new format.

The second modification, once again subordinate to the check on the enabled flag of the a graphics context, is represented by the fact that, in the case of internal YUV format and external RGBA format, instead of generating an error, for each color coordinate of each pixel, RGB performs the following matrix operation:

$$\begin{bmatrix} R \\ G \\ B \end{bmatrix} = \begin{bmatrix} 0.8942 & -0.2151 & 1.1399 \\ 1.0478 & -0.2975 & -0.5805 \\ 1.0315 & 2.0960 & -0.0005 \end{bmatrix} * \begin{bmatrix} Y \\ U \\ V \end{bmatrix}.$$

By deriving the matrices for passing from one color space to another and defining the new enumerators, it is possible to use each desired format (e.g., Y Cb Cr).

To complete further what has been described so far, the final part of this description will be dedicated, by way of recapitulation, to the presentation of the following:
modified APIs and new APIs to which reference was made previously;
flowcharts of FIGS. 20 to 26.

Modified APIs
Name:
glEnable, glDisable: these enable/disable the functions at the server end.
C Specification:
void glEnable(GLenum cap)
void glDisable(GLenum cap)
Parameters:
cap: this specifies a symbolic constant indicating the GL functions.
Description:
The various functions are enabled and disabled. For each of these, the initial value is false, with some exceptions for which the reader is referred to the OpenGL ES 1.x specifications.

The modification introduced consists in a series of new cap enumerators, which, if enabled, allow management of the appropriate video context on the basis of the format that it is wished to decode.

The new possible cap values are, for example:
GL_VIDEO_MPEG2: this identifies the MPEG2 video context
GL_VIDEO_MPEG4: this identifies the MPEG4 video context
GL_VIDEO_H264: this identifies the H264 video context
GL_VIDEO_VC1: this identifies the VC1 video context (also referred to as WM9)
Name:
glEnableClientState, glDisableClientState: these enable/disable the functions at the client end.
C Specification:
void glEnableClientSted (GLenum array)
void glDisableClientSted (GLenum array)
Parameters:
array: this specifies a symbolic constant indicating the GL functions.
Description:
The various functions are enabled and disabled individually at the client end. For each the initial value is false.

The modification introduced consists in a series of new array enumerators, which, if enabled, allow management of the video context and of the new array structures introduced.

The new possible array values are:
GL_QDCT_ARRAY: this identifies the array containing the values to be inversely quantized.
GL_MOTION_ARRAY: this identifies the array containing the values of the motion vectors.

Name:
glGetIntegerv: this returns the value of the parameter specified.
C Specification:
void glGetIntegerv(GLenum pname, GLint *params)
Parameters:
pname: this identifies the parameter that it must return.
params: this identifies the location in which to save the return value.
Description:
This command enables the values of some state variables, of an integer type, to be recovered from the context. The new possible values of pname introduced are:
GL_VIDEO_GOP: this identifies the state variable of the video context containing the value of GoP.
GL_VIDEO_WIDTH: this identifies the variable containing the value width in pixels of the frame.
GL_VIDEO_HEIGHT: this identifies the variable containing the value height in pixels of the frame.
GL_VIDEO_MBNUM: this identifies the variable containing the number of macroblocks per frame.
Name:
glGetString: this returns a string regarding the context.
C Specification:
GLubyte * glGetString(GLenum name)
Parameters:
name: this specifies a symbolic constant indicating the element that is wished to obtain.
Description:
In the graphics framework, as OpenGL ES specifications, it returns a pointer to a static string that describes some aspects of the graphics library.

In the video framework, it returns the pointers to the data structures of the video context, i.e., all the pointers of the elements contained in the VBO.

The new possible values of name are:
GL_VIDEO_PICTYPE: this identifies the structure containing the data on the type of pictures of the sequence.
GL_VIDEO_YDATA: this identifies the structure containing the luminance data Y.
GL_VIDEO_UDATA: this identifies the structure containing the chrominance data U.
GL_VIDEO_VDATA: this identifies the structure containing the chrominance data V.
GL_VIDEO_MBTYPE: this identifies the structure containing the data on the type of macroblocks of the frame.
GL_VIDEO_MBQUANT: this identifies the structure containing the data on the type of pictures of the sequence.
GL_VIDEO_FMV: this identifies the structure containing the data on the forward motion vector.
GL_VIDEO_BMV: this identifies the structure containing the data on the backward motion vector.
New APIs
Name:
glOpenVideoStream: this opens a video bitstream.
C Specification:
void glOpenVideoStream (GLchar *pointer)
Parameters:
pointer: this specifies the string pointer that identifies the video file to be processed.
Description:
This API recalls the process of opening of the MPEG stream, header decoding, VLC and decoding of the motion vectors.

At the end of the process in a memory area the preceding data are present, and the video context has been updated with the corresponding values of the video parameters and the pointers to the data in memory.

Furthermore, following upon this process, this block creates the object mesh of triangles to be used for each frame and saves it in the VBO. In order not to have to re-submit the API to application at each frame and for each pair of triangles, a picture element (PEL) of the video calculates its center coordinates, useful then at the motion-compensation stage.

Name:

glQDCTPointer: this defines an array of values to be inversely quantized.

C Specification:

void glQDCTPointer(GLint size, GLenum type, GLint intra, const GLvoid * pointer)

Parameters:

size: this identifies the dimension of a "vertex". In this case it is chosen equal to 4.

type: this identifies the type of data contained in the array. The initial value is GL_FLOAT.

intra: this identifies the type of inverse quantization to be applied on the basis of the type of frame.

pointer: this identifies the pointer to the first coordinate of the array.

Description:

This specifies a location and the data of an array of a vertex type, which could thus also be in the VBO 162, as in effect occurs for the video. When an array of this type is specified and enabled with the EnableClientState, its data are saved as state at the client end in the context.

Name:

glscale4f: this multiplies the current matrix by a matrix of

C Specification:

void glScale4f(GLfloat x, GLfloat y, GLfloat z, GLfloat w)

Parameters:

x, y, z, w: these specify individually the four scaling factors.

Description:

The four values defined through the parameters are used for building a [4×4] diagonal matrix, which will then be used for scaling the current matrix in the rendering step. This API derives from one that originally enables a non-uniform scaling along the three main axes x, y, z, given that w is set at 1. For the video, it recalls the same module of the pipeline, passing thereto a further parameter w other than 1 so as to apply a scaling with 4 elements, which now no longer represent the vertex coordinates, but are 4 generic elements to be transformed.

Name:

glIDCT2: this performs operations for the IDCT.

C Specification:

void glIDCT2 (GLvoid * pointer)

Parameters:

pointer: this specifies the pointer to the first coordinate of the array.

Description:

In order to perform the IDCT operation some standard APIs are used, which enable transformation matrices to be loaded, and a new one that performs the matrix product in the right order, namely, glIDCT2.

As input, it uses a pointer to the data structure present in the VBO 162 (but not necessarily) and then makes a series of multiplications, which are performed with the standard functions OpenGL ES, exactly in the same way as would be set at the client end with the API glMultMatrix( ) (hence without any modification of the algorithm), returning at the end of the process the values obtained in the same structure of the VBO 162 in which it has fetched them.

Name:

glMotionPointer: this defines an array containing the values of the motion vectors.

C Specification:

void glMotionPointer (GLint size, GLenum type, GLsizei prec, const GLvoid *pointer)

Parameters:

size: this identifies the dimension of a "vertex". In this case it is chosen equal to 2.

type: this specifies the type of data contained in the array. The initial value is GL_FLOAT.

prec: this identifies the precision with which each motion vector is defined.

pointer: this specifies the pointer to the first coordinate of the array.

Description:

This specifies a location and the data of an array of a vertex type, which hence could also be in the VBO 162, as in effect occurs for the video. When an array of this type is specified and enabled with the EnableClientState, its data are saved as state at the client end in the context.

The precision with which the motion vectors are defined is to be understood as the division factor of the individual coordinates, hence a precision of 1 means one pixel, a precision of 2 means half a pixel, a precision of 4 means a quarter of a pixel, etc.

To pass now to an examination of the flowcharts of FIGS. 20 to 26, it will be noted that all these diagrams start with a step (designated, in the various FIGS. 20 to 26, by the respective reference numbers 200, 210, 220, 250, 262, 270 and 280), in which it is verified whether the graphics accelerator is configured for operation as stream decoder of video images (output YES from the step), or else for functioning normally in the conventional graphics context (negative outcome of the comparison). As has already been said, said selection function is driven by an enumerator that is able to perform the corresponding switching action.

Figure 20:
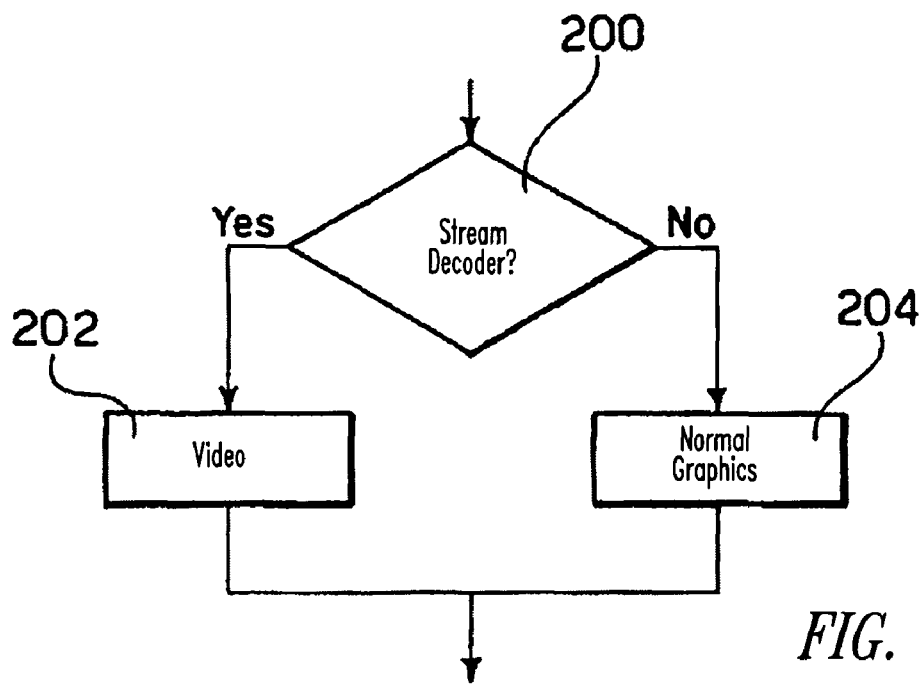
FIGS. 20 to 26 are flowcharts representing various processing functions performed in the system described herein.

In particular, the flowchart of FIG. 20 relates to a function of pre-processing of the state (basically carried out in the stage 152), which corresponds, according to the outcome of Step 200, to setting-up of the video context (Step 202) or else to setting-up of the normal graphics context (Step 204).

Figure 21:
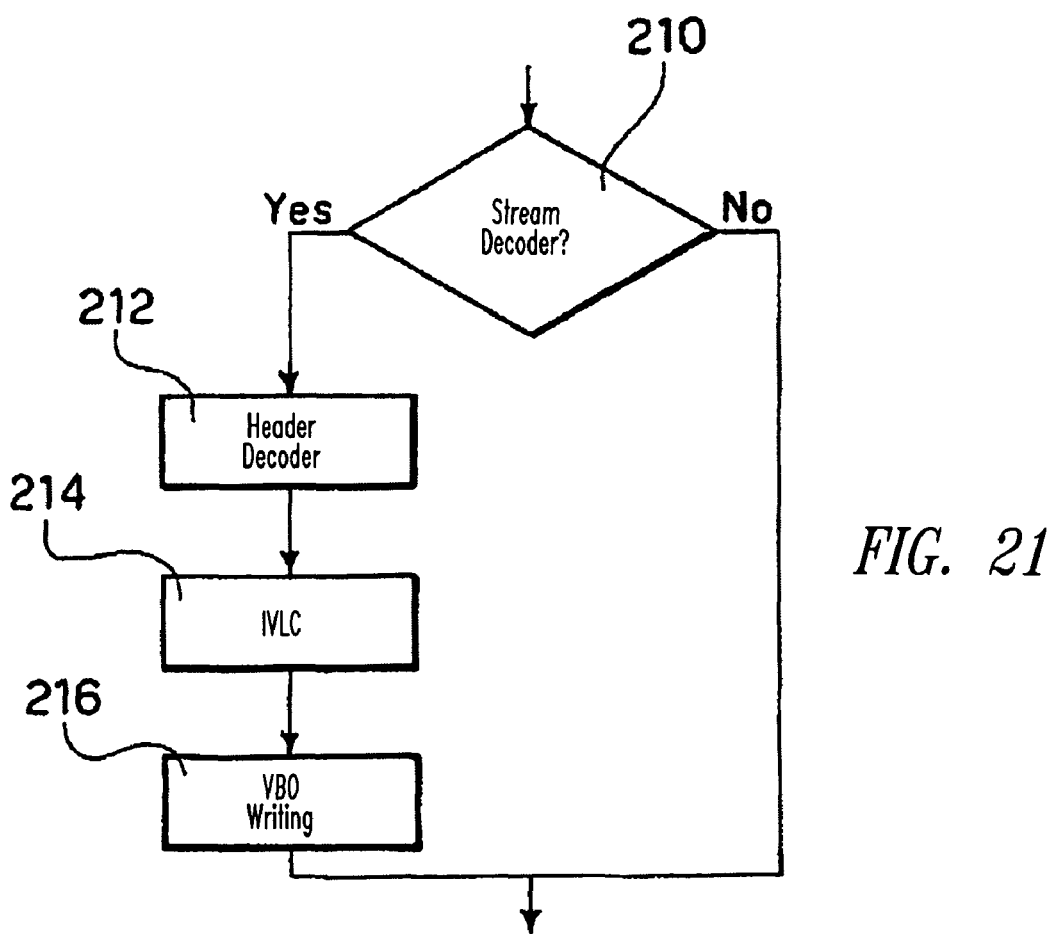

The flowchart of FIG. 21 corresponds to the functions performed in Block 152, i.e., header decoding (Step 212), the IVLC function and zigzag scanning (Step 214), as well as writing of the VBO 162 and updating of the context (Step 216). Of course, these steps are performed only in the video context, no step being envisaged in the case of operation in a graphics context (output NO from Step 210).

Figure 22:
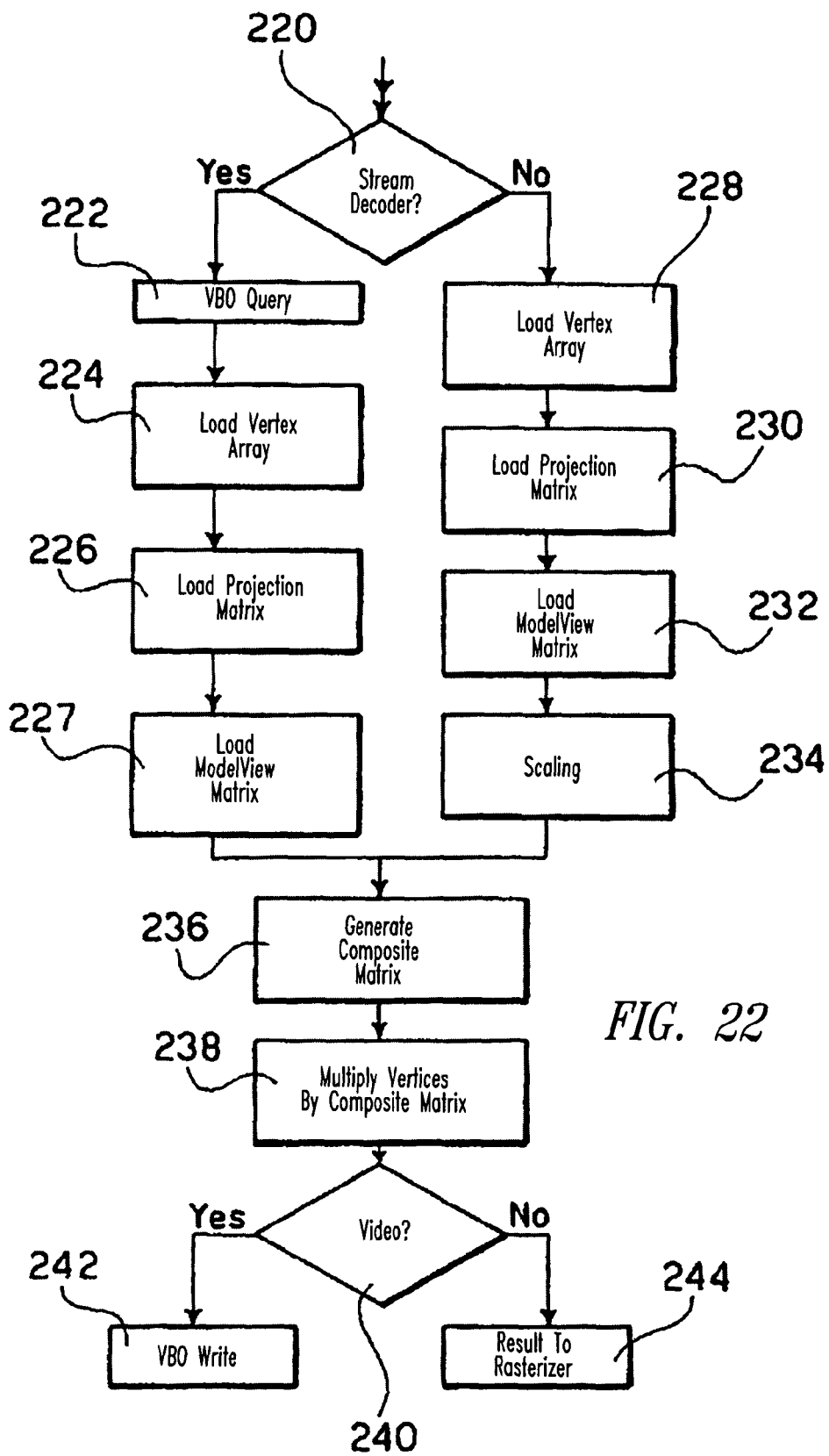

The flowchart of FIG. 22 refers to the function of inverse quantization, and in particular to the block Clip & Space Transformation.

In the case of operation in the video context, Step 222 basically envisages a query to the VBO 162 followed by loading (in Step 224) of the quantized values in the Vertex Array with corresponding updating of the context.

Step 226 represents loading of the quantization value Mquant in the Projection matrix using a uniform scaling, whilst Step 227 represents loading of the quantization coefficients in the ModelView matrix, once again using a uniform scaling.

The parallel steps performed in the case of operation in the traditional graphics context (output NO from Step 220) are basically:
loading of the vertex values in the Vertex Array with updating of the context (Step 228);
loading of the Projection matrix (Step 230);
loading of the ModelView matrix (Step 232); and
application of a uniform scaling (optional—Step 234).

Whatever the context of operation (video or graphics context), operation of the system evolves then towards a pair of common steps, 236 and 238, i.e., matrix multiplication for generating the composite matrix using the Projection and ModelView matrices (Step 236) and multiplication of the vertices with the composite matrix thus obtained (Step 238).

At this point, the system verifies once again, via the enumerator referred to previously, the type of operation context (video or graphics context). This occurs in Step 240, which causes the system, according to the context of operation, either to write the result in the VBO 162 (Step 242) or else to pass the result to the rasterizer stage 156 (Step 244).

Figure 23:
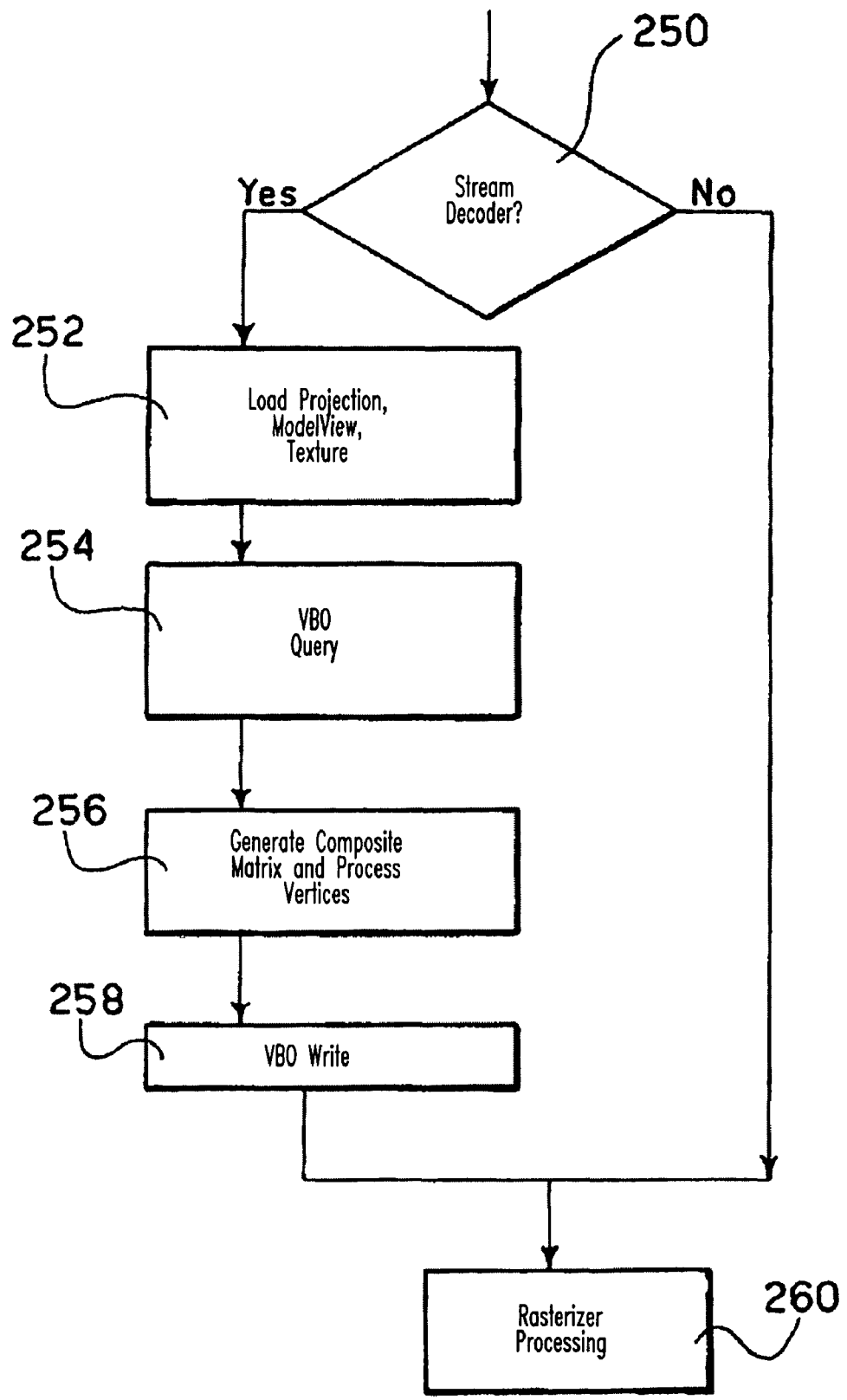

The flowchart of FIG. 23 relates, instead, to the execution of the IDCT function, and in particular to operation of the block Clip & Space Transformation.

As in the case of the flowchart of FIG. 21, in the case of operation in a graphics context (output NO from Step 250) practically no function is performed. In the case, instead, of operation in the video context (output YES from Step 250), in Step 252, A is loaded in the Projection matrix, C is loaded in the ModelView matrix, and F is loaded in Texture: the meaning of said wordings is evident in the light of the foregoing description, in particular with reference to FIGS. 9 and 10.

In a subsequent Step 254 the VBO 162 is queried, and the data are loaded into the processing section in the vertex array. Step 256 represents the matrix multiplication described previously and processing of the vertices. The results obtained are written in the VBO 162 in Step 258, after which, in Step 260, processing proceeds with the rasterizer stage 156.

Figure 24:
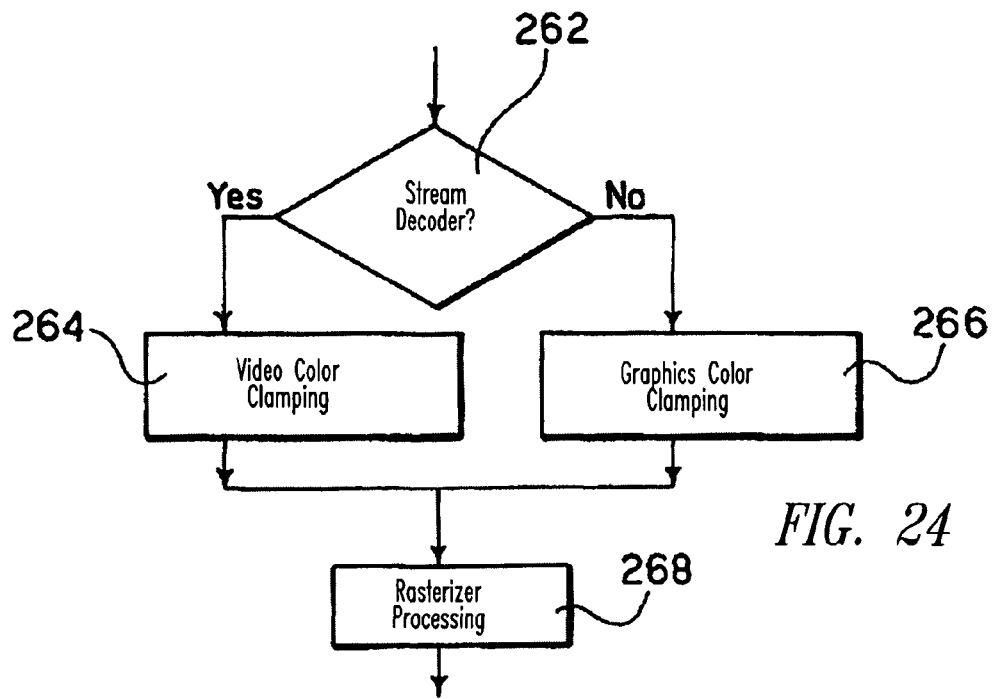

The flowchart of FIG. 24 represents the various modes with which, according to the outcome from Step 262 (YES: video context; NO: graphics context), the operation of color clamping is performed in two steps designated, respectively, by 264 and 266.

In the first case (video operation) the corresponding clamping range is from −1 to +1; in the case of graphics operation, the corresponding clamping range is from 0 to 1.

Step 268 indicates return to the rasterizer stage 156.

Figure 25:
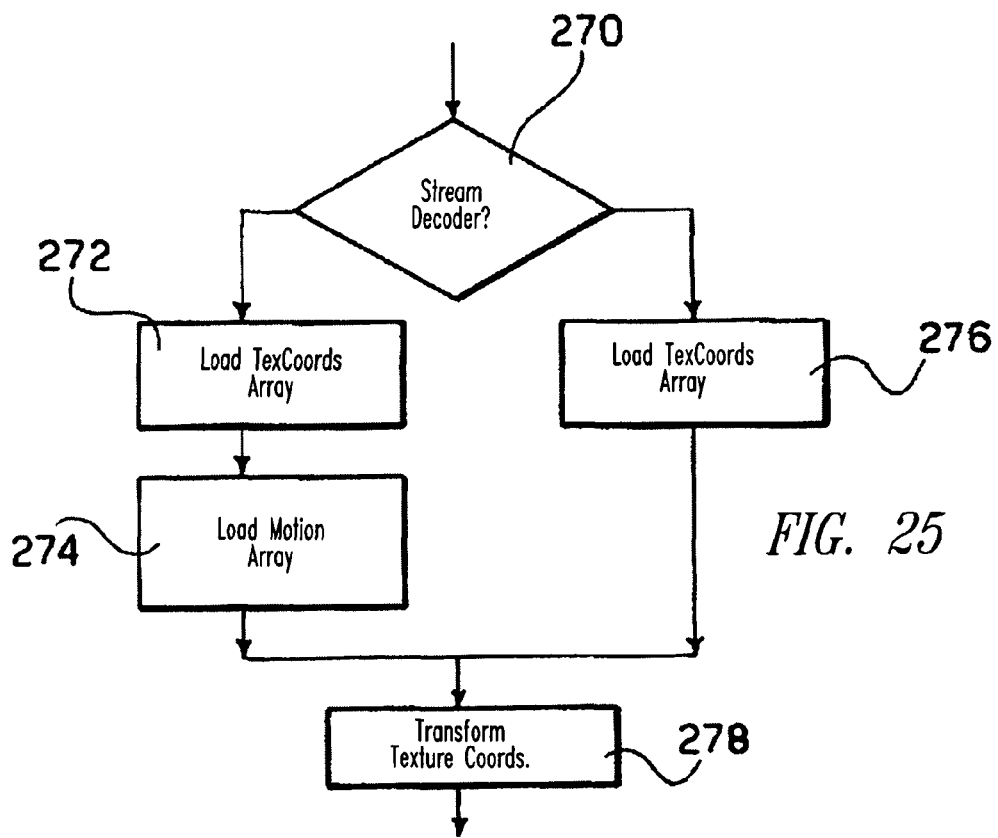

The flowchart of FIG. 25 represents the formation of the texture coordinates (TexCoords transformation).

In the case of video operation (output YES from Step 270), in Step 272 the pixel coordinates are loaded into the TexCoords array, with subsequent loading into the motion array of the motion vectors, which is an operation performed in a step designated by 274.

In the case of operation in a graphics context (output NO from Step 270) in a Step 276 the values of the array TexCoords are loaded. In either case, the processing evolves then to Step 278, in which the transformation of the texture coordinates is performed.

Figure 26:
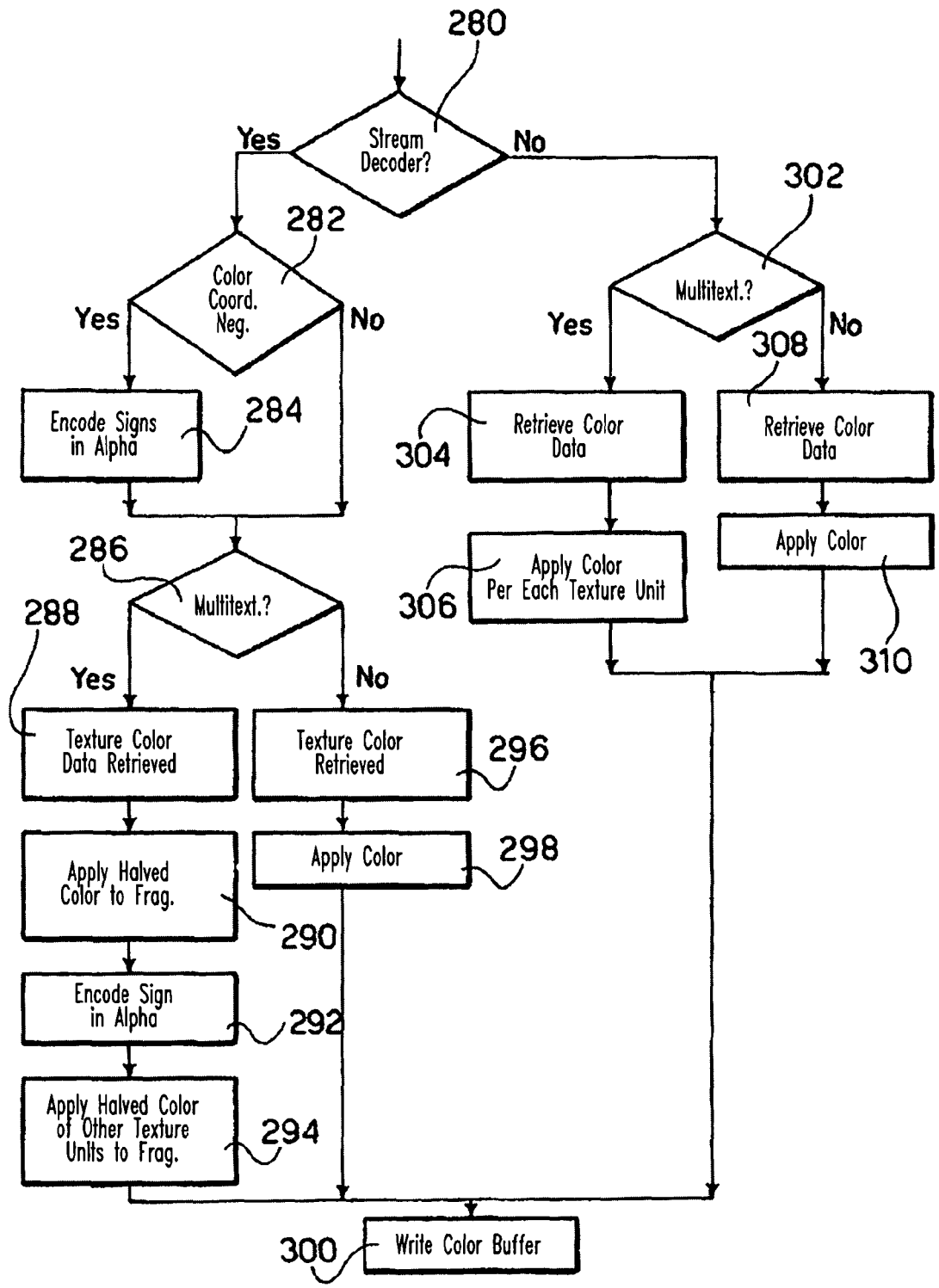

Finally, the flowchart of FIG. 26 represents operation of the block or blocks of the texture unit 158.

In the case of operation in a video context (output YES from Step 280), in Step 282 it is verified whether the value of the color coordinates received from the rasterizer stage 156 is possibly negative.

If so, in Step 284 the signs of each color are encoded in the Alpha channel.

After said encoding, or else if the color values are positive, in Step 286 it is verified whether a function of multitexturing is activated.

If it is (output YES from Step 286), in Step 288 the color data in the texture images are retrieved using the transformed coordinates TexCoords.

In a subsequent Step 290, the halved value of each color of the first texture unit is applied to the fragment using the sign data obtained through the Alpha channel.

Once again, in a Step 292, if the result is smaller than 0, the sign is encoded in the Alpha channel. Then, in a subsequent Step 294, once again the halved value of color of the other texture units or unit is applied to the fragment using the signs received through the Alpha channel.

If the output from Step 286 is NO, which indicates that a multitexturing function is not activated, after going through Step 296 basically identical to Step 288, in Step 298 the color is applied directly to the fragment.

The system then evolves to Step 300, which represents writing of the results obtained in the color buffer 160.

Also in the case of the flowchart of FIG. 26, output NO from Step 280 represents the fact that we are operating in a graphics context.

Also in this case, in Step 302 it is verified whether a multitexturing function is activated.

If it is (output YES from Step 302), in Step 304, in the texture images the color data are retrieved using the transformed coordinates TexCoords. Then, the color data are applied to the fragments in a distinct way for each texture unit.

If, instead, a multitexturing function is not activated (output NO from Step 302), after having retrieved, in Step 308, the color data in the texture images using the transformed coordinates TextCoords, in a subsequent Step 310 the color is applied to the fragment. Also in this case operation of the system evolves to Step 300 for writing the data obtained in the color buffer 160.

The system described herein may be used in a wide range of applications. In particular, at the system-on-chip level, it can be used in applications such as Set Top Box, mobile communications, automotive sector, etc.

In the case of the application as Set Top Box, it is possible to envisage an organization in two blocks that can manage 3D applications and video-decoding applications enabling competition between the aforesaid applications.

In the applications for mobile communications, it is possible to envisage the duplication of the block capable of managing 3D applications and video-decoding applications in competition.

Figure 27:
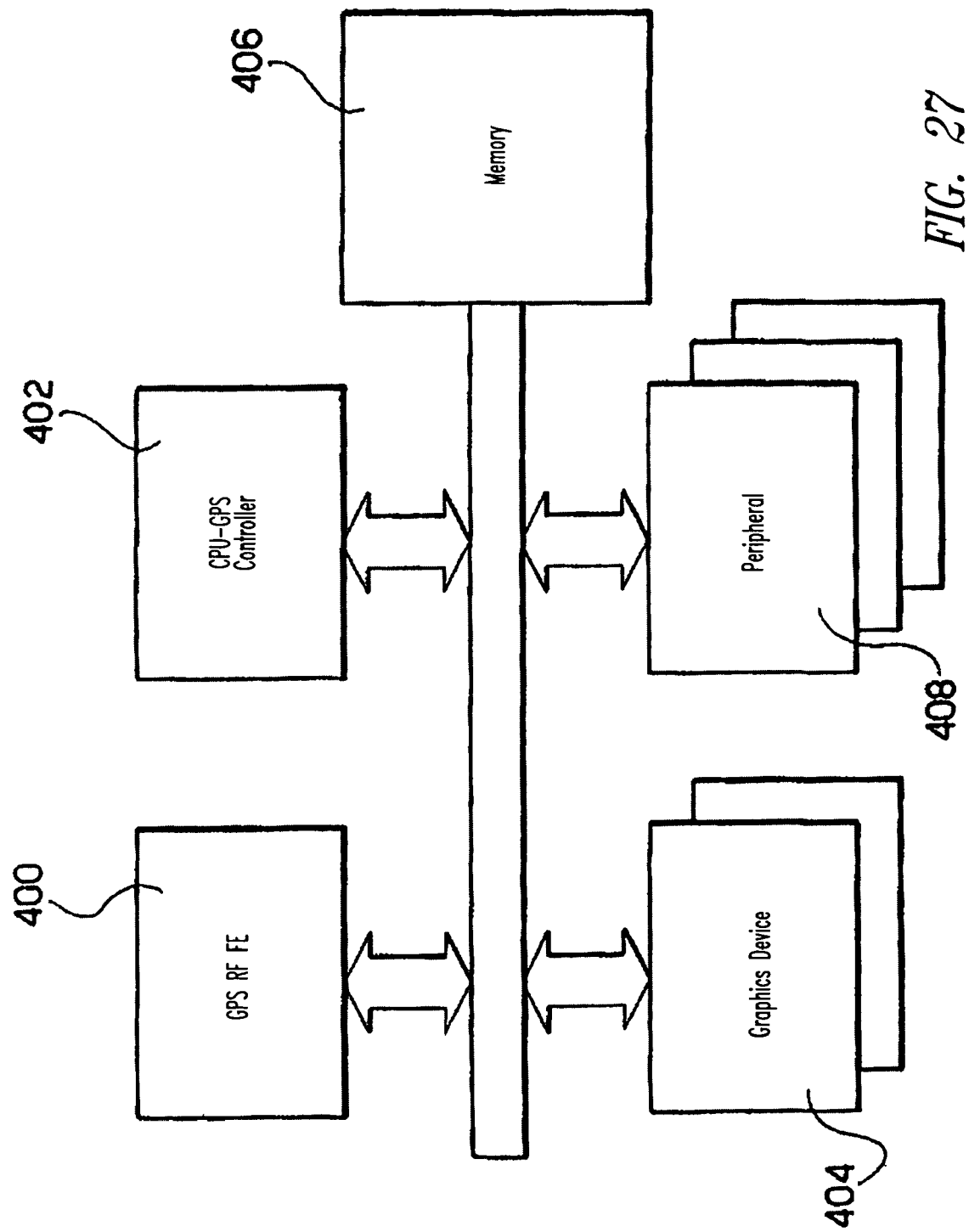
FIG. 27 is a block diagram that illustrates the possible application of the solution described herein in an "automotive" context.

In the automotive context, "infotainment" and car navigation applications assume an important role. In this case, as illustrated in FIG. 27, the block GPS RF FE (Global Positioning System Radiofrequency Front End) 400, supplies the down-conversion from the GPS signal (L1) to 1575 MHz through an intermediate frequency (IF) of 20 MHz to an output frequency of 4 MHz useful for a CPU-GPS controller 402.

The CPU 402 incorporates (DSP) hardware for processing the GPS (Global Positioning System) signal received from the satellites. The position signal appropriately formatted is sent to a graphics device 404, which returns synthetic maps fetched from a memory 406 and locates therein the current position. In addition, such a device can decode MPEG video signals drawn from a peripheral 408 and mix the graphic maps with said video signal.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for decoding a stream of compressed digital video images, comprising:
   reading said stream of compressed digital video images using a graphics accelerator;
   creating, via said graphics accelerator, starting from said stream of compressed digital video images, three-dimensional scenes to be rendered; and
   converting said three-dimensional scenes to be rendered into decoded video images.

2. The method according to claim 1, further comprising configuring said graphics accelerator as a pipeline.

3. The method according to claim 1, further comprising providing an enumerator for switching said graphics accelerator between operation in a graphics context and operation for decoding said stream of video images.

4. The method according to claim 1, further comprising controlling said graphics accelerator during operation for decoding said stream of compressed digital video images via a set of application programming interfaces.

5. The method according to claim 4 wherein said set of application programming interfaces comprises standard APIs for operation of said graphics accelerator in a graphics context.

6. The method according to claim 1, further comprising submitting said stream of compressed digital video images to at least one operation chosen in a group consisting of:
   header decoding;
   inverse variable-length coding;
   zigzag scanning;
   obtaining of quantized data regarding blocks of the stream; and
   decoding of motion vectors of the stream.

7. The method according to claim 1, further comprising deriving, from said stream of compressed digital video images, data on frame dimensions and frame number, type of images, and type of macroblocks.

8. The method according to claim 1 wherein creating said three-dimensional scenes to be rendered includes creating meshes of primitives.

9. The method according to claim 8, wherein creating said meshes of primitives includes creating meshes of two-dimensional geometrical figures.

10. The method according to claim 8 wherein creating said meshes of primitives includes containing the meshes of primitives in a vertex buffer object.

11. The method according to claim 8, further comprising performing a rasterization operation that returns, starting from said meshes of primitives, a set of pixels representing prediction error frames of said decoded video image.

12. The method according to claim 11, wherein performing said rasterization operation includes returning the set of pixels based on values of color coordinates of said compressed digital video images.

13. The method according to claim 12, wherein the returning includes returning the set of pixels based on the values of color coordinates even if the values of color coordinates are negative.

14. The method according to claim 1 wherein creating said three-dimensional scenes to be rendered includes creating said three-dimensional scenes to be rendered via inverse quantization and inverse discrete cosine transform.

15. The method according to claim 1 wherein converting said three-dimensional scenes to be rendered into decoded video images comprises combining said three-dimensional scenes to be rendered with motion data of said compressed digital video images and stored reference images, and applying motion compensation.

16. The method according to claim 15, further comprising supplying said converting operation with signs of the motion data separately from the motion data.

17. The method according to claim 16 wherein:
   said converting is performed via a texture unit provided with a channel for transmission of transparency data; and
   supplying said converting operation with the signs includes using said channel for transmission of transparency data to transmit the signs.

18. The method according to claim 15, wherein applying motion compensation includes applying bi-directional motion compensation implemented via multitexturing, the multitexturing including receiving color values from plural texture units, scaling the received color values, and applying the scaled color values to a fragment of the three-dimensional scenes to be rendered.

19. The method according to claim 1 wherein said operation of converting said three-dimensional scenes to be rendered into decoded video images comprises converting from a YUV color format to an RGB format.

20. A system for decoding a stream of compressed digital video images, comprising:
   a graphics accelerator including:
      reading means for reading said stream of compressed digital video images;
      creating means for creating, starting from said stream of compressed digital video images, three-dimensional scenes to be rendered; and
      converting means for converting said three-dimensional scenes to be rendered into decoded video images.

21. The system according to claim 20 wherein said graphics accelerator is configured as a pipeline.

22. The system according to claim 20 wherein said graphics accelerator is selectively switchable between operation in a graphics context and operation for decoding said stream of video images.

23. The system according to claim 20 wherein said graphics accelerator is controllable in the operation for decoding said stream of compressed digital video images via a set of Application Programming Interfaces.

24. The system according to claim 23 wherein said set of Application Programming Interfaces comprises standard APIs for operation of said graphics accelerator in a graphics context.

25. The system according to said graphics accelerator claim 20 wherein said reading means comprises a stage for submitting said stream of compressed digital video images to at least one operation chosen in the group constituted by:

header decoding;

inverse variable-length coding;

zigzag scanning;

obtaining of quantized data regarding the blocks; and decoding of the motion vectors.

26. The system according to claim 20 wherein said reading means comprises a stage for deriving from said stream of compressed digital video images the data on frame dimensions and frame number, type of images, and type of macroblocks.

27. The system according to claim 20 wherein said creating means comprises a geometrical stage for creating said three-dimensional scenes to be rendered as meshes of primitives.

28. The system according to claim 27 wherein said geometrical stage is configured for creating said three-dimensional scenes as meshes of two-dimensional geometrical figures, such as triangles.

29. The system according to claim 27 wherein said geometrical stage is configured for creating said three-dimensional scenes to be rendered as meshes of primitives contained in a Vertex Buffer Object.

30. The system according to claim 20 wherein said graphics accelerator comprises a geometrical stage for creating said three-dimensional scenes to be rendered via inverse quantization and inverse discrete cosine transform.

31. The system according to claim 20 wherein said creating means comprises a rasterizer stage for returning, starting from said meshes of primitives, a set of pixels representing prediction error frames of said decoded video images.

32. The system according to claim 31 wherein said rasterizer stage is supplied with values of color coordinates of said compressed digital video images.

33. The system according to claim 32 wherein said rasterizer stage is supplied with values of coordinates even if they are negative.

34. The system according to claim 20 wherein said converting means comprises a texture stage for converting said three-dimensional scenes to be rendered into decoded video images by combining said three-dimensional scenes to be rendered with motion data of said compressed digital video images and stored reference images and applying a function of motion compensation.

35. The system according to claim 34 wherein said texture stage is supplied with motion data without sign on a first channel and with the sign on a separate, second channel.

36. The system according to claim 35 wherein said texture stage is provided with a transparency data channel, which is used as said second channel for transmission of the sign.

37. The system according to claim 34 wherein said texture stage is configured for bi-directional motion compensation implemented via multitexturing, for scaling a value recovered from the image, adding the scaled value to a current fragment value.

38. A non-transitory computer-readable medium having contents that cause a graphics accelerator to decode a stream of compressed digital video images according to a method comprising:

reading said stream of compressed digital video images using the graphics accelerator;

creating, via said graphics accelerator, starting from said stream of compressed digital video images, three-dimensional scenes to be rendered; and converting said three-dimensional scenes to be rendered into decoded video images.

39. The non-transitory computer-readable medium according to claim 38, wherein the method comprises controlling said graphics accelerator during operation for decoding said stream of compressed digital video images via a set of application programming interfaces.

* * * * *